United States Patent
Hodge

(10) Patent No.: US 11,510,266 B2
(45) Date of Patent: *Nov. 22, 2022

(54) DUAL MODE TRANSMISSION IN A CONTROLLED ENVIRONMENT

(71) Applicant: **Global Tel*Link Corporation**, Reston, VA (US)

(72) Inventor: Stephen L. Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/193,576

(22) Filed: Mar. 5, 2021

(65) Prior Publication Data

US 2021/0195672 A1 Jun. 24, 2021

Related U.S. Application Data

(63) Continuation of application No. 16/893,786, filed on Jun. 5, 2020, now Pat. No. 10,952,272, which is a
(Continued)

(51) Int. Cl.
*H04W 12/37* (2021.01)
*H04W 76/16* (2018.01)
(Continued)

(52) U.S. Cl.
CPC .......... *H04W 76/16* (2018.02); *H04W 12/08* (2013.01); *H04W 12/086* (2021.01);
(Continued)

(58) Field of Classification Search
CPC ... H04W 76/16; H04W 12/08; H04W 12/086; H04W 12/37; H04W 76/15; H04W 84/12; H04W 88/06
See application file for complete search history.

(56) References Cited

U.S. PATENT DOCUMENTS 4,054,756 A 10/1977 Comella et al.
4,191,860 A 3/1980 Weber
(Continued)

FOREIGN PATENT DOCUMENTS

WO WO 00/72571 A2 11/2000
WO WO 01/44977 A2 6/2001

OTHER PUBLICATIONS

"Automated Coin Toll System (ACTS)," Telephone World, accessed at http://www.phworld.org/payphone/acts.htm, archived by web.archive.org on Feb. 28, 2009.
(Continued)

*Primary Examiner* — Joseph E Dean, Jr.
(74) *Attorney, Agent, or Firm* — Sterne, Kessler, Goldstein & Fox P.L.L.C.

(57) ABSTRACT

A dual-mode mobile device and a method for coordinating calls for the dual-mode mobile device over a first and second connection within a controlled environment is disclosed. The method includes communications between a monitoring server and the dual-mode mobile device over the first connection while the dual-mode mobile device conducts the call over the second connection. The monitoring server transmits control messages to the dual-mode mobile device to control operations of the dual-mode mobile device and establishment of the call and also monitors operations of the dual-mode mobile device as well as the communications transmitted and received by the dual-mode mobile device during the call.

20 Claims, 10 Drawing Sheets

Related U.S. Application Data continuation of application No. 16/526,222, filed on Jul. 30, 2019, now Pat. No. 10,716,160, which is a continuation of application No. 16/160,491, filed on Oct. 15, 2018, now Pat. No. 10,368,386, which is a continuation of application No. 15/626,953, filed on Jun. 19, 2017, now Pat. No. 10,104,710.

(51) Int. Cl.
| | |
|---|---|
| *H04W 12/08* | (2021.01) |
| *H04W 76/15* | (2018.01) |
| *H04W 12/086* | (2021.01) |
| *H04W 88/06* | (2009.01) |
| *H04W 84/12* | (2009.01) |

(52) U.S. Cl.
CPC ........... *H04W 12/37* (2021.01); *H04W 76/15* (2018.02); *H04W 84/12* (2013.01); *H04W 88/06* (2013.01)

(56) References Cited

U.S. PATENT DOCUMENTS

| | | | |
|---|---|---|---|
| 4,813,040 A | 3/1989 | Futato | |
| 4,935,956 A | 6/1990 | Hellwarth et al. | |
| 4,972,183 A | 11/1990 | Kuhlmann et al. | |
| 5,121,385 A | 6/1992 | Tominaga et al. | |
| 5,319,702 A | 6/1994 | Kitchin et al. | |
| 5,535,596 A | 7/1996 | Todack | |
| 5,539,812 A | 7/1996 | Kitchin et al. | |
| 5,563,931 A | 10/1996 | Bishop et al. | |
| 5,588,041 A | 12/1996 | Meyer, Jr. et al. | |
| 5,638,430 A | 6/1997 | Hogan et al. | |
| 5,655,013 A | 8/1997 | Gainsboro | |
| 5,684,866 A | 11/1997 | Florindi et al. | |
| 5,768,355 A | 6/1998 | Salibrici et al. | |
| 5,774,533 A | 6/1998 | Patel | |
| 5,778,313 A | 7/1998 | Fougnies | |
| 5,854,975 A | 12/1998 | Fougnies et al. | |
| 5,867,562 A | 2/1999 | Scherer | |
| 5,870,672 A | 2/1999 | Stoddard et al. | |
| 5,872,834 A | 2/1999 | Teitelbaum | |
| 5,875,236 A | 2/1999 | Jankowitz et al. | |
| 5,887,249 A | 3/1999 | Schmid | |
| 5,937,043 A | 8/1999 | He | |
| 6,052,454 A | 4/2000 | Kek et al. | |
| 6,072,860 A | 6/2000 | Kek et al. | |
| 6,134,660 A | 10/2000 | Boneh et al. | |
| 6,226,364 B1 | 5/2001 | O'Neil | |
| 6,240,167 B1 | 5/2001 | Michaels | |
| 6,289,100 B1 | 9/2001 | Ritter et al. | |
| 6,317,607 B1 | 11/2001 | Tomcik et al. | |
| 6,320,946 B1 | 11/2001 | Enzmann et al. | |
| 6,330,311 B1 | 12/2001 | Mijares | |
| 6,393,269 B1 | 5/2002 | Hartmaier et al. | |
| 6,430,274 B1 | 8/2002 | Winstead et al. | |
| 6,498,838 B1 | 12/2002 | Schoenborn | |
| 6,570,891 B1 | 5/2003 | Arimilli | |
| 6,570,970 B2 | 5/2003 | Gruchala et al. | |
| 6,574,464 B1 | 6/2003 | Chen | |
| 6,577,718 B1 | 6/2003 | Kalmanek, Jr. et al. | |
| 6,614,781 B1 | 9/2003 | Elliott et al. | |
| 6,639,977 B1 | 10/2003 | Swope et al. | |
| 6,668,044 B1 | 12/2003 | Schwartz et al. | |
| 6,687,350 B1 | 2/2004 | Landry et al. | |
| 6,775,267 B1 | 8/2004 | Kung et al. | |
| 6,819,932 B2 | 11/2004 | Allison et al. | |
| 6,836,540 B2 | 12/2004 | Falcone et al. | |
| 7,042,992 B1 | 5/2006 | Falcone et al. | |
| 7,054,430 B2 | 5/2006 | Lynam et al. | |
| 7,079,636 B1 | 7/2006 | McNitt et al. | |
| 7,080,049 B2 | 7/2006 | Truitt et al. | |
| 7,092,494 B1 | 8/2006 | Anders et al. | |
| 7,102,509 B1 | 9/2006 | Anders et al. | |
| 7,106,843 B1 | 9/2006 | Gainsboro et al. | |
| 7,184,747 B2 | 2/2007 | Bogat | |
| 7,197,560 B2 | 3/2007 | Caslin et al. | |
| 7,333,798 B2 | 2/2008 | Hodge | |
| 7,496,345 B1 | 2/2009 | Rae et al. | |
| 7,503,063 B1 | 3/2009 | Mishra et al. | |
| 7,505,406 B1 | 3/2009 | Spadaro et al. | |
| 7,643,518 B2 | 1/2010 | Salter et al. | |
| 7,766,223 B1 | 8/2010 | Mello et al. | |
| 7,860,133 B2 | 12/2010 | Salter et al. | |
| 7,899,167 B1 | 3/2011 | Rae | |
| 8,014,800 B2 | 9/2011 | Törnkvist | |
| 8,139,736 B2 | 3/2012 | Brown et al. | |
| 8,156,182 B2 | 4/2012 | Hawkins | |
| 8,243,896 B1 | 8/2012 | Rae | |
| 8,295,446 B1 | 10/2012 | Apple et al. | |
| 8,355,492 B1 | 1/2013 | Polozola et al. | |
| 8,379,815 B2 | 2/2013 | Lynam et al. | |
| 8,477,766 B2 | 7/2013 | Kwon | |
| 8,489,068 B1 | 7/2013 | Edwards et al. | |
| 8,577,003 B2 | 11/2013 | Rae | |
| 8,582,738 B1 | 11/2013 | Keiser | |
| 8,626,118 B2 | 1/2014 | Smith et al. | |
| 8,794,509 B2 | 8/2014 | Bishop et al. | |
| 8,838,622 B2 | 9/2014 | Irving et al. | |
| 8,929,524 B2 | 1/2015 | Hodge | |
| 9,014,355 B2 | 4/2015 | Heaton et al. | |
| 9,509,856 B2 | 11/2016 | Heaton et al. | |
| 9,574,671 B1 | 2/2017 | Amberg et al. | |
| 9,578,128 B2 | 2/2017 | Nerieri et al. | |
| 9,729,649 B1 | 8/2017 | Beguin | |
| 9,787,854 B2 | 10/2017 | Heaton et al. | |
| 10,104,710 B1 | 10/2018 | Hodge | |
| 10,333,870 B2 | 6/2019 | Hodge | |
| 10,368,386 B2 | 7/2019 | Hodge | |
| 10,412,231 B2 | 9/2019 | Heaton et al. | |
| 10,716,160 B2 | 7/2020 | Hodge | |
| 10,798,109 B2 | 10/2020 | Ford | |
| 10,952,272 B2 * | 3/2021 | Hodge | H04W 12/08 |
| 2001/0028705 A1 | 10/2001 | Adams et al. | |
| 2002/0041660 A1 | 4/2002 | Nakamura | |
| 2002/0052841 A1 | 5/2002 | Guthrie et al. | |
| 2002/0076025 A1 | 6/2002 | Liversidge et al. | |
| 2002/0103899 A1 | 8/2002 | Hogan et al. | |
| 2002/0131374 A1 | 9/2002 | Lee | |
| 2002/0143655 A1 | 10/2002 | Elston | |
| 2002/0168060 A1 | 11/2002 | Huie | |
| 2002/0183040 A1 | 12/2002 | Lundstrom et al. | |
| 2003/0002639 A1 | 1/2003 | Huie | |
| 2003/0037133 A1 | 2/2003 | Owens | |
| 2003/0086546 A1 | 5/2003 | Falcone et al. | |
| 2003/0123632 A1 | 7/2003 | Smith | |
| 2003/0193961 A1 | 10/2003 | Moore et al. | |
| 2003/0220884 A1 | 11/2003 | Choi et al. | |
| 2003/0229613 A1 | 12/2003 | Zargham et al. | |
| 2004/0022380 A1 | 2/2004 | Lynam et al. | |
| 2004/0029564 A1 | 2/2004 | Hodge | |
| 2004/0058667 A1 | 3/2004 | Pienmaki et al. | |
| 2004/0090953 A1 | 5/2004 | Salter et al. | |
| 2004/0114739 A1 | 6/2004 | Hausmann et al. | |
| 2004/0153396 A1 | 8/2004 | Hinderer | |
| 2004/0173674 A1 | 9/2004 | Matsuura | |
| 2005/0009525 A1 | 1/2005 | Evslin | |
| 2005/0123111 A1 | 6/2005 | Philbin et al. | |
| 2005/0125411 A1 | 6/2005 | Kilian et al. | |
| 2005/0135579 A1 | 6/2005 | Creamer et al. | |
| 2005/0238154 A1 | 10/2005 | Heaton et al. | |
| 2006/0098796 A1 | 5/2006 | Link | |
| 2006/0149644 A1 | 7/2006 | Sulmar et al. | |
| 2007/0041545 A1 | 2/2007 | Gainsboro | |
| 2007/0155411 A1 | 7/2007 | Morrison | |
| 2007/0263812 A1 | 11/2007 | Polozola et al. | |
| 2008/0015881 A1 | 1/2008 | Shankar | |
| 2008/0108382 A1 | 5/2008 | Salter et al. | |
| 2008/0112436 A1 | 5/2008 | Salter et al. | |
| 2008/0175362 A1 | 7/2008 | Bangor et al. | |
| 2008/0220739 A1 | 9/2008 | Muoio et al. | |
| 2008/0311888 A1 | 12/2008 | Ku et al. | |
| 2009/0019376 A1 | 1/2009 | Quillen et al. | |

(56) References Cited

U.S. PATENT DOCUMENTS

| | | |
|---|---|---|
| 2009/0042539 A1 | 2/2009 | Jiang et al. |
| 2009/0049529 A1 | 2/2009 | Felger |
| 2009/0054031 A1 | 2/2009 | Smith et al. |
| 2009/0098939 A1 | 4/2009 | Hamilton, II et al. |
| 2009/0180600 A1 | 7/2009 | Blackwell et al. |
| 2009/0304166 A1 | 12/2009 | Hodge |
| 2010/0035594 A1 | 2/2010 | Vendrow et al. |
| 2010/0097440 A1 | 4/2010 | Lee |
| 2010/0304712 A1 | 12/2010 | Sweeney et al. |
| 2011/0004635 A1 | 1/2011 | Chesbrough et al. |
| 2012/0079045 A1 | 3/2012 | Plotkin |
| 2012/0079591 A1 | 3/2012 | Hassan-Le Neel et al. |
| 2012/0155628 A1 | 6/2012 | Booth et al. |
| 2012/0202454 A1 | 8/2012 | Smith et al. |
| 2012/0233307 A1 | 9/2012 | Soundrapandian et al. |
| 2012/0303502 A1 | 11/2012 | Centanni, Jr. et al. |
| 2012/0321064 A1 | 12/2012 | Czachor, Jr. et al. |
| 2013/0080510 A1 | 3/2013 | Leftik et al. |
| 2013/0094640 A1 | 4/2013 | McClure |
| 2013/0263227 A1 | 10/2013 | Gongaware et al. |
| 2013/0275516 A1 | 10/2013 | Grant |
| 2014/0258937 A1 | 9/2014 | Lee |
| 2014/0267547 A1 | 9/2014 | Torgersrud et al. |
| 2014/0269618 A1 | 9/2014 | Surface et al. |
| 2014/0358520 A1 | 12/2014 | Davey |
| 2014/0368669 A1 | 12/2014 | Talvala et al. |
| 2015/0030314 A1 | 1/2015 | Skarakis |
| 2015/0070516 A1 | 3/2015 | Shoemake et al. |
| 2015/0078541 A1 | 3/2015 | Hodge |
| 2015/0229776 A1 | 8/2015 | Heaton et al. |
| 2016/0028900 A1 | 1/2016 | Heaton et al. |
| 2016/0191453 A1 | 6/2016 | Thomas et al. |
| 2016/0373907 A1 | 12/2016 | Dowlatkhah et al. |
| 2017/0180564 A1 | 6/2017 | Heaton et al. |
| 2017/0230314 A1 | 8/2017 | Odell et al. |
| 2017/0251100 A1 | 8/2017 | Keiser et al. |
| 2017/0264579 A1 | 9/2017 | Fang et al. |
| 2017/0331770 A1 | 11/2017 | Griffin et al. |
| 2017/0331960 A1 | 11/2017 | Hodge et al. |
| 2019/0014062 A1 | 1/2019 | Hodge |
| 2019/0158658 A1 | 5/2019 | Gebers et al. |
| 2019/0159275 A1 | 5/2019 | Hodge |
| 2019/0268345 A1 | 8/2019 | Gebers et al. |
| 2019/0364000 A1 | 11/2019 | Hodge |
| 2020/0008257 A1 | 1/2020 | Hodge |
| 2020/0028815 A1 | 1/2020 | He et al. |
| 2020/0305212 A1 | 9/2020 | Hodge |
| 2020/0314236 A1 | 10/2020 | Gebers et al. |

OTHER PUBLICATIONS

"Cisco IAD2400 Series Business-Class Integrated Access Device," Cisco Systems Datasheet, 2003.

"Customer Owned Coin Operated Telephones (COCOT)," Telephone World, accessed at http://www.phworld.org/payphone/cocot.htm, archived by web.archive.org on Jan. 27, 2009.

"History and Key Milestones," Logica, accessed at http://www.logica.com/history+and+key+milestones/350233679, archived by web.archive.org on Dec. 24, 2009.

"SIP and IPLinkTM in the Next Generation Network: An Overview," Intel, 2001.

"Survey of Telephone Switching: Chapter 11," Telephone Tribute, accessed at http://www.telephonetribute.com/switches survey chapter 11 .html, archived by web.archive.org on Jul. 14, 2009.

"Voice Over Packet in Next Generation Networks: An Architectural Framework," Bellcore, Special Report SR-4717, Issue 1, Jan. 1999.

"Criminal Calls: A Review of the Bureau of Prisons' Management of Inmate Telephone Privileges," U.S. Department of Justice, Office of the Inspector General, Aug. 1999.

"VoIP Adoption Still Growing in Consumer and Business Markets," accessed at http://www.voicewalker.net/news/voip-adoption-stillgrowing-in-consumer-and-business-markets/, archived by web.archive.org on Jul. 28, 2012; 2 pages.

"Why Can't You Make a Collect Call to a Cell Phone," National Public Radio, Jun. 30, 2008, Accessed via http://www.npr.org/templates/story/story.php?storyId=92021561 on Apr. 6, 2015.

1800MumDad.com.au—Explanation, Aug. 29, 2007—Retrieved from the Internet Archive Wayback Machine at https://web.archive.org/web/20070829114354/http://1800mumdad.com.au/main.php?type=charges2; 2 pages.

1800MumDad.com.au—Summary Standard Form of Agreement, Apr. 26, 2006—Retrieved from the Internet Archive Wayback Machine at https://web.archive.org/web/20060426180115/http://www.1800mumd ad.com.au/main.php?type=summarysfoa; 3 pages.

Ahimovic et al., "Services for Tomorrow's PCS," IEEE International Conference on Universal Personal Communications, vol. 1, Oct. 12-15, 1993; pp. 222-227.

Assignment of U.S. Pat. No. 8,190,121 and U.S. Appl. No. 13/449,308.

Brown, et al., "SMS: The Short Message Service," Computer, vol. 40, No. 12, 2007.

BubbleLINK® Software Architecture (Science Dynamics 2003).

Bur Goode, Voice Over Internet Protocol (VoIP), Proceedings of the IEEE, vol. 90, No. 9, 1495-1517 (Sep. 2002).

Clifford J. Weinstein, MIT, The Experimental Integrated Switched Network—A System-Level Network Test Facility (IEEE 1983).

Commander Call Control System, Rev. 1.04 (Science Dynamics 2002).

Confalone et al., "Calling Card Service—TSPS Hardware, Software, and Signaling Implementation," The Bell System Technical Journal, Sep. 1982, vol. 61, No. 7; pp. 1675-1714.

Defendant Global Tel*Link Corporation's Amended Answer to First Amended Complaint and Counterclaims, filed in *Securus Technologies, Inc.* v. *Global Tel*Link Corporation*, Case No. 3:16-cv-01338-K (N.D. Tex.), filed Jan. 9, 2017; 66 pages.

Definition of "circuit switching", Newton's Telecom Dictionary, New York: Flatiron Publishing, Inc., 1996; p. 253.

Definition of "code", Microsoft Computer Dictionary, 5th Edition, Redmond, WA: Microsoft Press, 2002; p. 106.

Definition of "telephony", McGraw-Hill Dictionary of Scientific and Technical Terms, 6th Edition (McGraw-Hill, 2003).

Definitions of "code", "comprise", "number", and "including", The American Heritage College Dictionary, 3rd Edition (Houghton Mifflin Company, 1997); 10 pages.

Definitions of "Local Area Network (LAN)" and "Wide Area Network (WAN)," Microsoft Computer Dictionary (Microsoft Press 2002), pp. 304 and 561.

Digital Copy of "Bellcore Notes on the Networks," Bellcore, Special Report SR-2275, Issue 3, Dec. 1997.

Disclaimer filed Jul. 31, 2014 in U.S. Appl. No. 12/969,068 (U.S. Pat. No. 8,477,766).

Excerpts from the Prosecution History of U.S. Appl. No. 10/135,878, filed Apr. 29, 2002.

File History of U.S. Appl. No. 14/703,639, filed May 4, 2015; 189 pages.

File History of U.S. Pat. No. 7,899,167, U.S. Appl. No. 10/642,532, filed Aug. 15, 2003.

File History of U.S. Pat. No. 8,190,121, U.S. Appl. No. 12/103,138, filed Apr. 15, 2008.

File History of U.S. Pat. No. 8,489,068, U.S. Appl. No. 12/766,159, filed Apr. 23, 2010.

File History of U.S. Pat. No. 8,577,003, U.S. Appl. No. 13/009,483, filed Jan. 19, 2011.

File History of U.S. Pat. No. 8,626,118, U.S. Appl. No. 13/449,308, filed Apr. 17, 2012.

File History of U.S. Pat. No. 9,509,856, U.S. Appl. No. 14/689,521, filed Apr. 17, 2015.

Reexamination U.S. Appl. No. 90/012,802 of U.S. Pat. No. 8,190,121, filed Mar. 1, 2013.

Garner, et al., "Mobile Terminated SMS Billing—Exploits and Security Analysis," IEEE International Conference on Information Technology: New Generations, 2006.

International Search Report and Written Opinion directed to International Patent Application No. PCT/US2017/031947, dated Aug. 10, 2017; 17 pages.

(56) References Cited

OTHER PUBLICATIONS

Ismail, et al., "Prepaid and Postpaid VoIP Service Enhancements 1013 and Hybrid Network Performance Measurement," Information Technology Journal, vol. 5, Issue 2, 2006.
Jeff Hewett and Lee Dryburgh, Signaling System No. 7 (SS7/C7): Protocol, Architecture, and Services (Networking Technology) at 85 (Cisco Press, Jun. 2005).
McKitterick et al., "State of the Art Review of Mobile Payment Technology," Department of Computer Science, Trinity College Dublin; 22 pages.
Office Action directed to European Patent Application No. 03 772 898.7, dated Jun. 9, 2008.
Operator Service System Generic Requirements, OSSGR, TR-TSY-000271, Collect Billing, Rev. 3, Mar. 1988; 50 pages.
Osifchin, N., "A Telecommunications Buildings/Power Infrastructure in a New Era of Public Networking," IEEE 2000.
PacketCable TM 1.0 Architecture Framework Technical Report, PKT-TR-ARCH-V0 1-001201 (Cable Television Laboratories, Inc. 1999).
Pages from http://www.corp.att.com/history, archived by web.archive.org on Nov. 4, 2013.
Photocopy of "Bellcore Notes on the Networks (Formerly BOC Notes on the LEC Networks)," Bellcore, Special Report SR-2275, Issue 3, Dec. 1997.
Response to Office Action, filed Jan. 6, 2009, in Prosecution History of U.S. Appl. No. 10/642,532, filed Aug. 15, 2003.
Rey, R.F., ed., "Engineering and Operations in the Bell System," 2nd Edition, AT&T Bell Laboratories: Murray Hill, NJ, 1983.
Rosenberg, et al., "SIP: Session Initial Protocol," Network Working Group, Standard Track, Jun. 2002; 269 pages.
Schwartz, et al., "How to Build an SMS Service," O'Reilly Short Cuts, 2007.
Science Dynamics, Inmate Telephone Control Systems, http://scidyn.com/fraudprev_main.htm (archived by web.archive.org on Jan. 12, 2001).
Science Dynamics, SciDyn BubbleLINK, http://www.scidyn.com/products/bubble.html (archived by web.archive.org on Jun. 18, 2006).
Science Dynamics, SciDyn Call Control Solutions: Commander II, http://www.scidyn.com/products/commander2.html (archived by web.archive.org on Jun. 18, 2006).
Science Dynamics, SciDyn IP Gateways, http://scidyn.com/products/ipgateways.html (archived by web.archive.org on Aug. 15, 2001).
Science Dynamics, Science Dynamics—IP Telephony, http://www.scidyn.com/iptelephony_maim.htm (archived by web.archive.org on Oct. 12, 2000).
Sundstrom, K., "Voice over IP: An Engineering Analysis," Master's Thesis, Department of Electrical and Computer Engineering, University of Manitoba, Sep. 1999.
The Line Information Database (LIDB) and Wireless Services, Telcordia Technologies White Paper, Dec. 2001; 31 pages.
U.S. Appl. No. 60/935,634, "Method of Enabling an SMS Text Message to Facilitate Payment on a Cellular Bill for a Billable Call Received on a Cell Phone," to Martin, et al., filed Aug. 23, 2007.
Valcourt, et al., "Investigating mobile payment: Supporting technologies, methods, and use," IEEE International Conference on Wireless and Mobile Computing, Networking, and Communications, 2005.
Wireless Interconnection and Reciprocal Compensation Agreement Between Community Telephone Company and United States Cellular Corporation, Apr. 24, 2006; 29 pages.

* cited by examiner

DUAL MODE TRANSMISSION IN A CONTROLLED ENVIRONMENT

CROSS REFERENCE TO RELATED APPLICATION

This application is a continuation of U.S. Nonprovisional patent application Ser. No. 16/893,786, filed on Jun. 5, 2020, which is a continuation of Ser. No. 16/526,222, filed on Jul. 30, 2019, which is a continuation of U.S. Nonprovisional application Ser. No. 16/160,491, filed on Oct. 15, 2018, issued as U.S. Pat. No. 10,368,386, which is a continuation of U.S. Nonprovisional patent application Ser. No. 15/626,953, filed Jun. 19, 2017, issued as U.S. Pat. No. 10,104,710, both titled "Dual Mode Transmission in a Controlled Environment," and the contents of all of which are hereby incorporated herein by reference in their entirety.

BACKGROUND

Field

This disclosure relates to controlling the establishment of calls within a controlled environment between a dual-mode transmission mobile device and an outside provider, such as a cellular provider.

Background

While inmates within a controlled environment are typically allowed to engage in communications with a person outside of the controlled environment, such communications are generally routed through a calling system associated with the controlled environment. Such a restriction imposed on calls to and from mobile devices within the controlled environment requires the use of specific mobile devices distributed by the controlled environment. In other words, inmates are not allowed to use their own personal mobile devices within the controlled environment. This requirement is potentially costly as it requires the controlled environment to purchase and provide all mobile devices that are made available its inmates. Moreover, all outgoing calls had to be routed through a network connection of the controlled environment.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
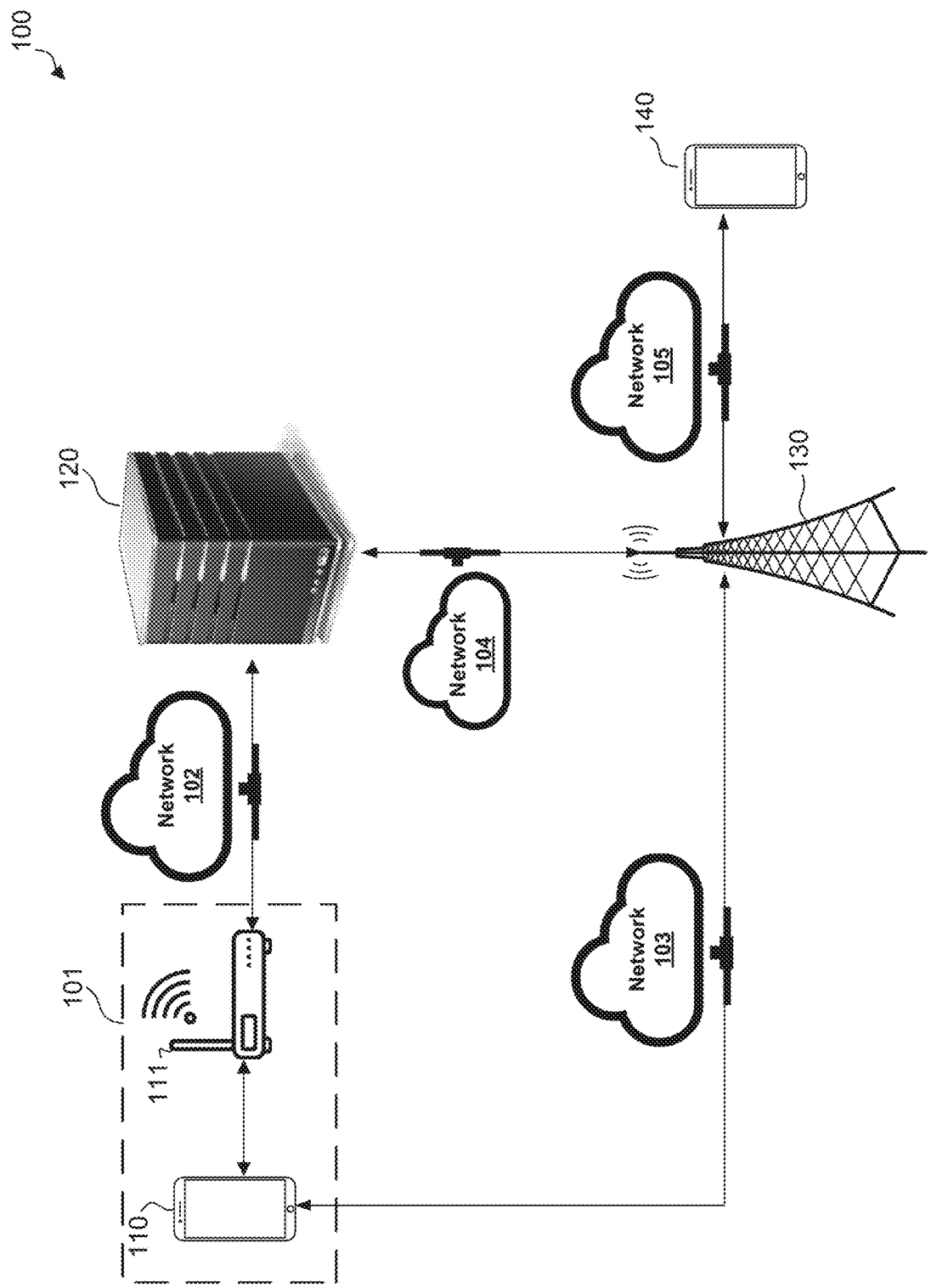
FIG. 1 illustrates a block diagram of an exemplary dual-mode call management system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Accordingly, there is a need for controlled environments to allow its inmates to use the personal mobile devices for activities that can be typically performed through issued mobile devices while the inmates are incarcerated within the controlled environments. Allowing use of personal mobile devices would allow a controlled environment save money by having to purchase less mobile devices for use by its inmates. Because the inmates are using their own personal mobile devices, inmates will also take better care of their own devices. The personal mobile device can be retained by the inmate after his incarceration and used to make phone calls through the inmate's cellular provider provided that the inmate consents to the policies and requirements of the jurisdiction including signing a consent form waiving their fourth amendment rights granting the controlled environment authority to monitor and record all communications made by the inmate through his mobile device while incarcerated in the controlled environment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or customize for various applications such exemplary embodiments, without undue experimentation, without departing from the spirit and scope of the disclosure. Therefore, such modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Exemplary Dual-Mode Call Management System

FIG. 1 illustrates a block diagram of an exemplary dual-mode call management system 100, according to embodiments of the present disclosure. Dual-mode call management system 100 includes a controlled environment 101, such as a prison. Implemented within controlled environment 101 are dual-mode mobile device 110 and access point 111. Access point 111 can be implemented as any device that provides network access such as, but not limited to, a router, a modem, smartphone, a tablet, or a laptop device. In some embodiments, dual-mode call management system 100 further includes monitoring server 120, a cellular provider 130, and an outside device 140. One dual-mode mobile device, one monitoring server, one cellular provider, and one outside device are shown for simplicity; it is understood that dual-mode call management system 100 can include more than one of these devices without departing from the scope of this disclosure. Dual-mode mobile device 110 is any mobile device such as but not limited to a smartphone phone, a tablet, or a wearable device that is operated by an inmate of controlled environment 101. Although monitoring server 120 is shown implemented outside of controlled environment 101, in some embodiments, monitoring server 120 is implemented within controlled environment 101. Cellular provider 130 is any provider that provides cellular service to mobile devices. Outside device 140 refers to any device that is operated by a user who is located outside of or is not incarcerated in the controlled environment. A call between dual-mode mobile device 110 and outside device 140 includes both audio-only and video calls.

In some embodiments, dual-mode mobile device 110 is connected to monitoring server 120 through access point 111 and network 102. Outside device 140 is connected to cellular provider 130 through network 105. Monitoring server 120 acts as an intermediary through network 102 and network 104 between dual-mode mobile device 110, cellular provider 130, and outside device 140. Dual-mode mobile device 110 communicates primarily through access point 111 and network 102 to monitoring server 120. In certain situations which are discussed in more detail below, monitoring server 120 may grant permission to dual-mode mobile device 110 to communicate over network 103 to cellular provider 130 bypassing access point 111 and monitoring server 120. For example, in an embodiment, upon entering controlled environment 101, the cellular function of dual-mode mobile device 110 is disabled which prevents dual-mode mobile device 110 from communicating over network 103 with cellular provider 130 until authorization is received from monitoring server 120. In other words, monitoring server 120 manages communications to and from dual-mode mobile device 110 while dual-mode mobile device 110 is within controlled environment 101. Monitoring server 120 is connected to cellular provider 130 through network 104.

The connection between dual-mode mobile device 110 and access point 111 employs a wireless network such as described in the Institute of Electrical and Electronics Engineers (IEEE) 802.11 standard, sometimes referred to as "Wi-Fi." Network 102 includes any or all of a Local-Area Network (LAN), a Wide-Area Network (WAN), or the Internet, depending on the location of monitoring server 120 in relation to dual-mode mobile device 110 and monitoring server 120. For example, network 102 is implemented as a LAN when monitoring server 120 is co-located within controlled environment 101. In another example, network 102 is implemented as a WAN or the Internet when monitoring server 120 is located remotely from controlled environment 101. In some embodiments, monitoring server 120 is cloud-based and includes one or more cloud-based servers. In some embodiments, monitoring server 120 is a server within a data center that supports the wireless devices within the controlled environment. Accordingly, in some embodiments, dual-mode mobile device 110 communicates with monitoring server 120 over a Wi-Fi connection through network 102 and access point 111.

In some embodiments, network 103 is implemented as a cellular network such as a global system for mobile communication (GSM) network or a code division multiple access (CDMA) network. Similarly, dual-mode mobile device 110 and outside device 140 can include GSM and/or CDMA capability for communicating over networks 103 and 105. Network 104 connects cellular provider 130 with monitoring server 120. Monitoring server 120 utilizes network 104 to manage communications transmitted through networks 103 and 105. Network 105 connects outside device 140 and cellular provider 130. Networks 104 and 105 can be implemented as a WAN, the Internet, and/or a Public Switched Telephone Network (PSTN), a GSM network, a CDMA network, a 3G network, a 4G network, a 5G network or any successor cellular network.

Dual-mode call management system 100 provides management of dual-mode mobile device 110 which can be implemented as any mobile device capable of communicating over network 102 with monitoring server 120 and network 103 with cellular provider 130, such as but not limited to a smartphone, a tablet or a wearable device. In some embodiments, dual-mode mobile device 110 is a bring your own (BYO) device that is owned by an inmate prior to his incarceration in controlled environment 101. As will be discussed further below, a BYO device requires special management by monitoring server 120 before the BYO device can be used within dual-mode call management system 100. For example, all files in BYO devices must be analyzed to ensure compliance with security policies of controlled environment 101 and organizing files in the BYO devices based on whether the files are allowed or prohibited from use while dual-mode mobile device 110 is operated in controlled environment 101. Such a step is an important for BYO devices because they include personal files owned and purchased by the inmate prior to his incarceration in controlled environment 101. Monitoring server 120 also downloads and installs control software on BYO devices such that monitoring server 120 can control and monitor all usage and activity of BYO devices by the inmates.

In some embodiments, controlled environment 101 can provide dual-mode mobile device 110 to its inmates. In such embodiments, dual-mode mobile device 110 includes control software pre-installed by monitoring server 120 prior to providing it to the inmates; there is no need for monitoring server 120 to analyze or organize files prior to distribution to the inmates since, in these embodiments, dual-mode mobile device 110 never leaves controlled environment 101 and is owned and controlled by monitoring server 120.

Whether dual-mode mobile device 110 is a BYO device or is provided by controlled environment 101, dual-mode mobile device 110 is operated by inmates within controlled environment 101 and are remotely managed and updated by monitoring server 120. As previously described, dual-mode mobile device 110 includes administrative software that enable administrators to remotely access, configure, and control operations of dual-mode mobile device 110. In order to implement the dual-mode calling functionality described herein, dual-mode mobile device 110 further includes specialized software that enable dual-mode mobile device 110 to handoff communications between two different wireless connections, including but not limited to Wi-Fi and cellular.

In some embodiments, monitoring server 120 acts as an intermediary in a call between dual-mode mobile device 110 and outside device 140. Functions of monitoring server 120 include but are not limited to managing calls based on inmate profiles for inmates within controlled environment 101, receiving requests for calls from dual-mode mobile device 110 and outside device 140, establishing calls between dual-mode mobile device 110 and outside device 140, and coordinating handoffs of calls between networks 102 and 103. Monitoring server 120 further manages the inmates profiles established for each inmate of the controlled environment and enforces any restrictions or conditions associated with the inmates and/or calls. Monitoring server 120 also records and monitors all calls involving dual-mode mobile device 110 whether the calls are conducted through network 102 or network 103.

In some embodiments, outside device 140 is a device that is operated by participants that are outside of the controlled environment and includes but is not limited to a cellular phone, a smart phone, a laptop, and a tablet. In an embodiment, outside device 140 may be located within controlled environment 101, such as in a designated area or room of controlled environment 101. Accordingly, devices can be considered outside of the controlled environment when they are operated by participants who are not incarcerated or otherwise detained within the controlled environment and/or not directly managed or controlled by the controlled environment. In another embodiment, outside device 140 may be located outside of the controlled environment such as in the outsider's home.

In some embodiments, monitoring server 120 monitors calls between dual-mode mobile device 110 and outside device 140. Monitoring server 120 analyzes calls including audio and video analysis depending on whether the call is an audio-only or video call to ensure that participants in the call are behaving consistent with guidelines established by controlled environment 101. For example, monitoring server 120 can detect within calls whether participants are having impermissible topics such as discussing illegal activities or are having lewd conversations.

Monitoring server 120 monitors conferences automatically (e.g., upon establishing a call) and/or manually (e.g., initiated by an administrator of controlled environment 101 or by authorized personnel). Additionally, monitoring server 120 analyzes calls in real-time (e.g., while calls are on-going) and/or on a delayed basis (e.g., on recorded calls). In some embodiments, monitoring server 120 establishes a mirroring session over network 120 with dual-mode mobile device 110 in order to stream calls conducted between dual-mode mobile device 110 and cellular provider 130 over network 103. Monitoring server 120 requires dual-mode mobile device 110 to stream on-going calls to monitoring server 120 over the mirroring session so that monitoring server 120 can remotely perform real-time monitoring and analysis on calls.

In some embodiments, monitoring calls includes detecting and/or analyzing characteristics of calls which include but are not limited to an audio stream of a call, a video stream of a call, and actions performed by the participants during a call. Actions include words spoken by participants and physical actions of participants (e.g., during a video call). Detected prohibited actions can trigger monitoring server 120 to perform a predetermined action to control the call such as terminating the call, provide a warning to the participants of the call, and/or provide an alert of the detected prohibited action to the appropriate administrators.

Exemplary Monitored Conference Device

Figure 2:
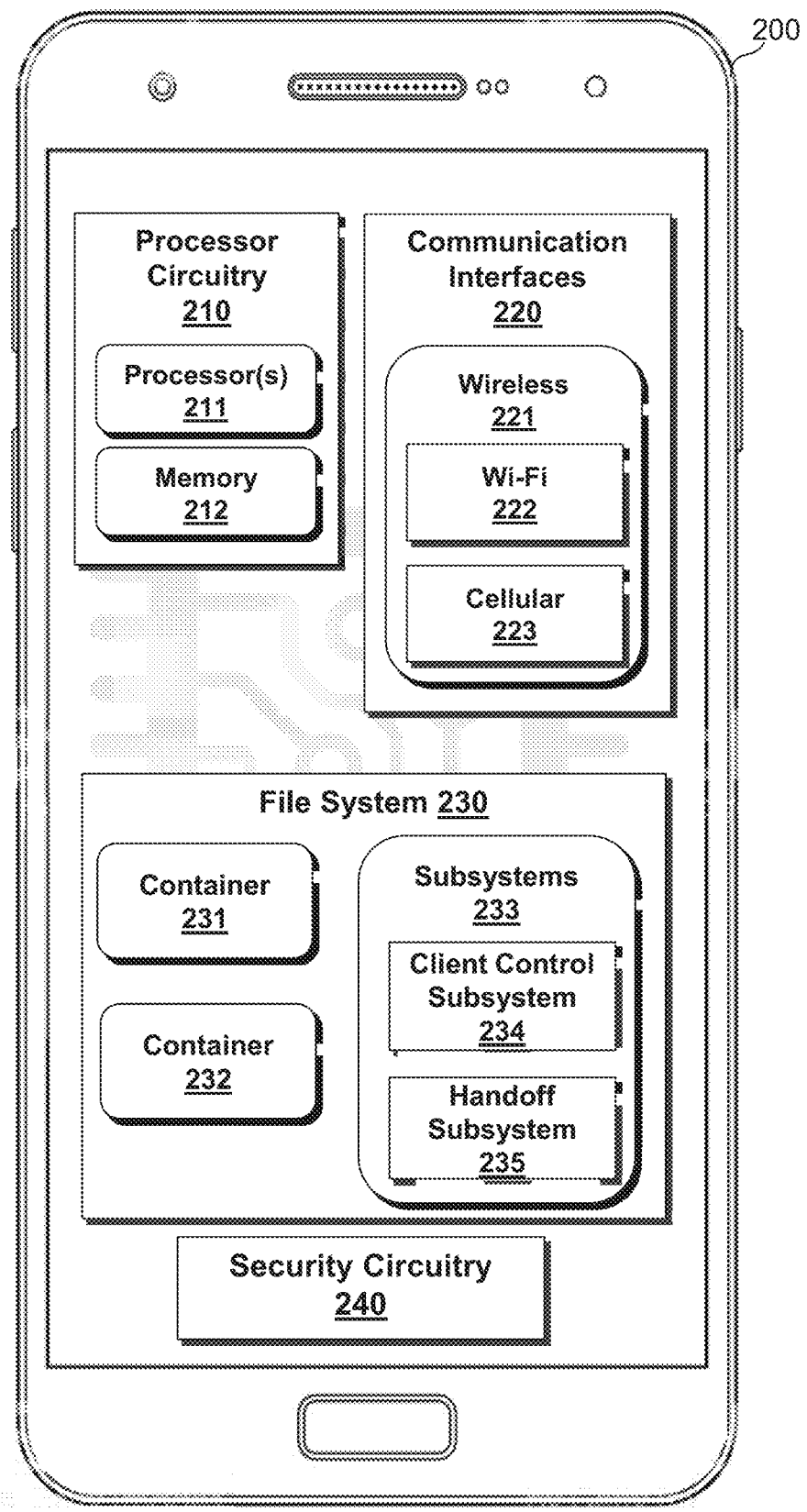
FIG. 2 illustrates a block diagram of an exemplary dual-mode mobile device for use in the exemplary dual-mode call management system of FIG. 1, according to embodiments of the present disclosure.

FIG. 2 illustrates a block diagram of an exemplary dual-mode mobile device 200 for use in the exemplary dual-mode call management system 100 of FIG. 1, according to embodiments of the present disclosure. Dual-mode mobile device 200 represents an exemplary embodiment of dual-mode mobile device 110 as described in FIG. 1. In some embodiments, dual-mode mobile device 200 includes processor circuitry 210, communication interfaces 220, and file system 230.

Processor circuitry 210 includes one or more processors 211 and memory 212. The number of processors 211 can be scaled to match the number of simultaneous user connections desired to be supported by a dual-mode call management system such as dual-mode call management system 100 of FIG. 1. Processors 211 control the operation of dual-mode mobile device 200 and its components. In some embodiments, memory 212 can be any well-known volatile and/or non-volatile memory that is removable and/or non-removable. Memory 212 can store inmate preferences, inmate profiles, and inmate conference personal allowed number (PAN) lists, which includes information regarding dual-mode mobile device 200.

In some embodiments, communication interfaces 220 includes one or more transceivers, transmitters, and/or receivers that communicate via a wireless interface 221, such as Wi-Fi interface 222 and cellular interface 223. Wireless interface 221 can include additional communications' interfaces, such as a Bluetooth transceiver, that enables Bluetooth communication between dual-mode mobile device 200 and an external device that also has Bluetooth capability, such as an access point or another dual-mode mobile device 200. In an embodiment, wireless interface 221 is configured to transmit and receive communications to monitoring server 120 via network 102 and to cellular provider 130 via network 103.

File system 230 includes components that enable the dual-mode calling functionality of dual-mode mobile device 200. File system includes container 231, container 232, and subsystems 233 which includes client control subsystem 234 and handoff subsystem 235. Container 231 and container 232 are created by client control subsystem 234 based on restrictions associated with the inmate and global rules established by controlled environment 101. Although two containers are depicted in FIG. 2, file system 230 can contain additional containers as necessary to encapsulate the files of dual-mode mobile device 200. A container is a partition within a file system into which certain files can be allocated and each container imposes different restrictions on accessing or executing files based on execution rules associated with each container. For example, container 231 can be associated with an execution rule that prevents any access to files stored within container 231 by a user of dual-mode mobile device 200. Execution rules can also be conditional. For example, container 232 can be associated with an execution rule that prevents any access by a user of dual-mode mobile device 200 unless dual-mode mobile device 200 is connected to monitoring server 120 through network 102.

Files are allocated to containers based on restrictions specified in the inmate's profile and on global rules of controlled environment 101. Restrictions in an inmate's profile apply specifically to the inmate associated with the inmate profile. For example, an inmate profile includes blacklist and a personal allowed number (PAN) list that include numbers associated with only the inmate associated with the inmate profile. Continuing the example of the containers described above, contact information specified in a blacklist would be allocated to container 231 which would prevent the inmate from accessing the information. Conversely, contact information specified in the inmate's PAN list would be allocated to a container associated with an execution rule that would allow access by the inmate.

Allocation of files to containers is also controlled by global rules of controlled environment 101. Global rules are restrictions or permissions that apply to groups of inmates or all inmates of controlled environment 101. For example, controlled environment 101 can establish a global rule regarding certain files from being downloaded to or used by any dual-mode mobile device 200 within controlled environment 101. Accordingly, a container would be established on all mobile devices within controlled environment 101 and allocate any files identified in the global rule into the container.

Subsystems 233 includes client control subsystem 234 and handoff subsystem 235. Client control subsystem 234 implements a client control application installed on dual-mode mobile device 200 by monitoring server 120. Monitoring server 120 controls operations and usage of dual-mode mobile device 200 by communicating with client control subsystem 234 such as by sending control messages. Client control subsystem 234 further verifies that data transmitted and/or actions taken by files executed on dual-mode mobile device 200 comply with execution rules associated with container 231 and container 232 and global rules of controlled environment 101. Handoff subsystem 235 coordinates communications with monitoring server 120 and cellular provider 130 and is responsible for coordinating any handoffs between sessions established over network 102 to new sessions established over network 103, and vice versa.

Client control subsystem 234 and handoff subsystem 235 coordinate to provide features associated with the dual-mode call functionality. In other words, prior to installation of the client control application and establishment of necessary containers, dual-mode mobile device 200 is not permitted to conduct calls with cellular provider 130. When the client control application is installed and files allocated to appropriate containers, dual-mode mobile device 200 has access to permitted features of the dual-mode call including submitting call requests through monitoring server 120.

In some embodiments, client control subsystem 234 also monitors an ongoing call between dual-mode mobile device 200 and cellular provider 130. Monitoring the call includes analyzing the call such as through word recognition or biometric analysis. Word recognition includes monitoring the call for any keywords that controlled environment 101 has identified as being triggers for notifications. For example, keywords may include words of violence. Biometric analysis includes voice recognition for identifying parties during the call, which may be used to prevent parties from handing off devices to unauthorized parties. For example, controlled environment may establish a rule identifying a change in voice during a call as a trigger for either terminating the call and/or transmitting a notification. Accordingly, client control subsystem 234 is also enabled to transmit notifications to authorized personnel of controlled environment 101 upon detection of triggers established by controlled environment 101.

In some embodiments, client control subsystem 234 manages Wi-Fi interface 222 and cellular interface 223. For example, in some embodiments, client control subsystem 234 maintains a Wi-Fi connection between Wi-Fi interface 222 and monitoring server 120. Client control subsystem 234 uses the Wi-Fi connection to allow monitoring server 300 to maintain control over dual-mode mobile device 200. For example, client control subsystem 234 can receive control messages from monitoring server 120 and is programmed to disable operations of dual-mode mobile device

200 upon detecting an interruption of communications between dual-mode mobile device 200 and monitoring server 120 over the Wi-Fi connection. For example, client control subsystem 234 may detect an interruption in the control messages. In some embodiments, the control messages are received periodically and at predetermined intervals. In some embodiments, disabling operations of dual-mode mobile device 200 includes but is not limited to disabling cellular interface 223, disabling handoff subsystem 235, disabling file system 230, and shutting down dual-mode mobile device 200.

In some embodiments, client control subsystem 234 provides operation information to monitoring server 300 regarding activities performed by the inmate and dual-mode mobile device 200. Operation information includes actions performed by the inmate such as identification of applications accessed by the inmate, communications such as emails or text messages transmitted by the inmate, and key logging information such as the words typed by the inmate during operation of dual-mode mobile device 200. The operation information allows monitoring server 300 to monitor and track the inmate's usage of dual-mode mobile device 200 and ensure compliance with the usage policies of controlled environment 101. In some embodiments, operation information is transmitted periodically such as on a predetermined schedule. In other embodiments, the operation information is transmitted upon a request from monitoring server 300.

In some embodiments, file system 230 manages inmate information such as the inmate profile. Inmate information can further include information regarding call preferences associated with the inmate, global rules governing the inmate's use of call functionality (e.g., rules that control call functionality through dual-mode mobile device 200), and settings associated with dual-mode mobile device 200. Call functionality includes the ability to request calls with cellular provider 130. As a non-limiting example, global rules can specify that the inmate currently using dual-mode mobile device 200 has access to only certain features of call functionality and can specify features of the dual-mode call management system 100 to which the inmate has access such as but not limited to: a contact list and a schedule specifying permitted and restricted times at which the inmate can conduct calls. In some embodiments, global rules specify conditions that trigger notifications to authorized personnel. For example, a global rule can specify that a change in voices during a call (e.g., detected through biometric analysis) triggers a notification.

In some embodiments, security circuitry 240 coordinates security of dual-mode mobile device 200 by authenticating users and by communicating authentication information with monitoring server 120. Security circuitry 240 can authenticate users of dual-mode mobile device 200 utilizing identity data of inmates. Identity data includes but is not limited to at least one of a username and password data, challenge questions, challenge answers, biometric data, device data such as make and model of a communication device, and/or location data. Biometric data includes one or more of a finger print, a hand print, a voice sample, an iris or retinal sample, an image of the user (2D or 3D), a hand geometry, a signature identification, an infrared camera identification, or any other biometric as deemed appropriate. The challenge question form of identity data may be a series of challenge questions, or a single challenge question such as the last four digits of an inmate's social security number, mother's maiden name, and the like. Authentication subsystem 216 is further configured to facilitate a secure communication between parties receiving/transmitting a communication by performing identity verifications to authenticate identities of purported parties. The identity verification includes logon verifications, such as username and password verifications, biometric verification, response to challenge questions, device verification, and/or location verification.

Exemplary Conference Server

Figure 3:
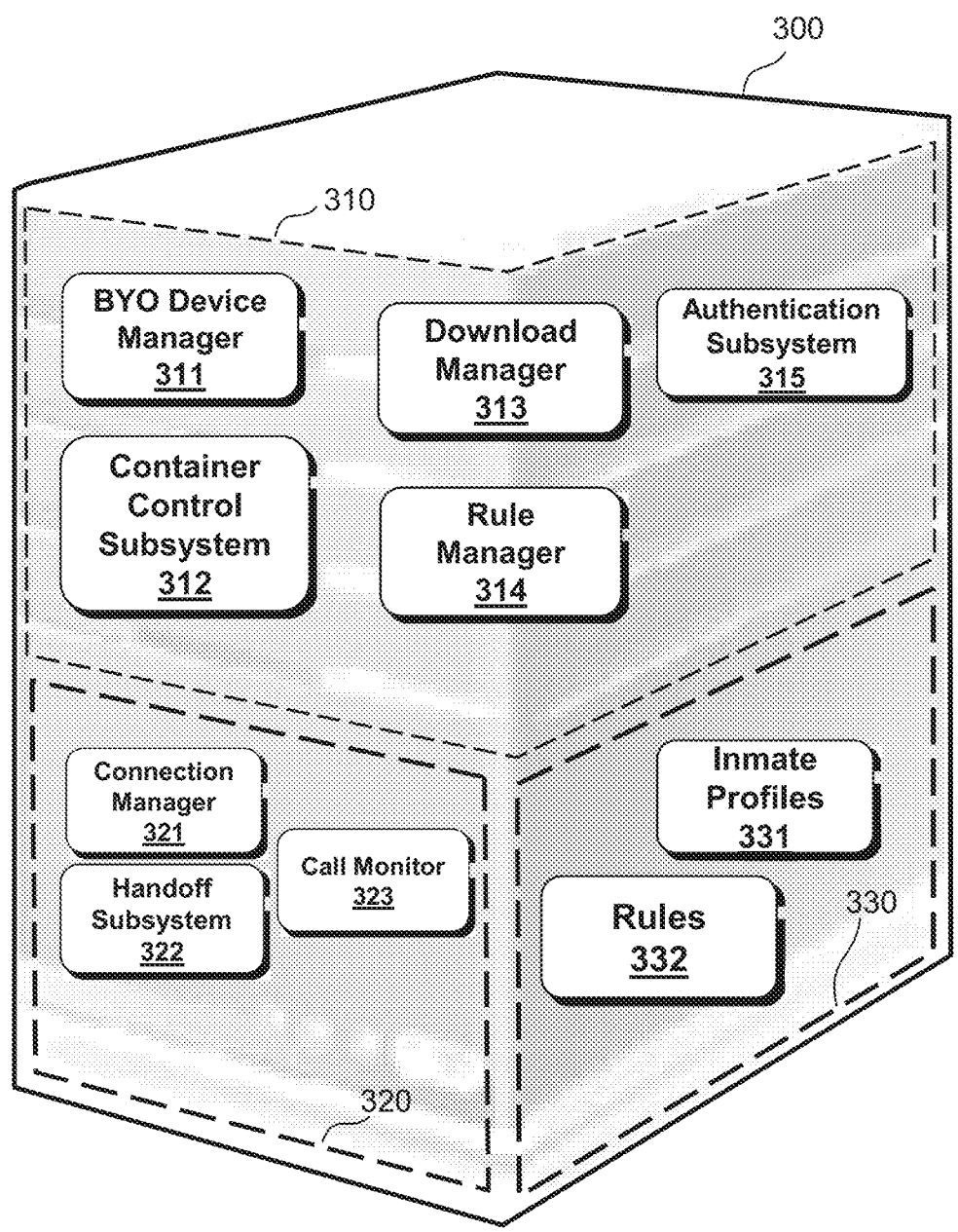
FIG. 3 illustrates an exemplary monitoring server for use in the exemplary dual-mode call management system of FIG. 1, according to embodiments of the present disclosure.

FIG. 3 illustrates a block diagram of monitoring server 300, according to embodiments of the present disclosure. In an embodiment, monitoring server 300 represents an exemplary embodiment of monitoring server 120 of FIG. 1. Monitoring server 300 includes but is not limited to managed mobile device management system (MMDM) 310, dual-mode call system 320, and database 330. Monitoring server 300 manages BYO devices and manages dual-mode call establishment for mobile devices within controlled environment 101. Monitoring server 300 employs MMDM 310 for managing BYO devices and dual-mode call system 320 for managing dual-mode calls.

MMDM 310 includes one or more processors, computers, or servers identified as subsystems and can be constructed as individual physical hardware devices, or as virtual devices, such as a virtual server. The number of processors can be scaled to match the number of simultaneous user connections desired to be supported by a dual-mode call management system such as dual-mode call management system 100 of FIG. 1. MMDM 310 manages mobile devices within controlled environment including dual-mode mobile device 200. MMDM 310 further manages execution rules responsible for establishing containers and coordinates with the client control subsystem in each mobile device to ensure enforcement of the execution rules with respect to the files in each mobile device. As described above, in some embodiments, dual-mode mobile device 200, whether a BYO device or a mobile device provided by controlled environment 101, are required to connect to the monitoring server 300 through network 102 in order to perform certain functions while operating within controlled environment 101. Accordingly, all data transmitted by wireless devices can be monitored by monitoring server 300 and MMDM 310 and dual-mode call system 320. MMDM 310 performs the above functions through its components which include but are not limited to BYO device manager 311, container control subsystem 312, download manager 313, rule manager 314, and authentication subsystem 315.

BYO device manager 311 manages BYO devices in controlled environment 101. As described above, BYO devices are owned by inmates, associated with a cellular provider, and contain data and files that have not been approved for use or execution within controlled environment 101. Inmates can be allowed to retain their mobile devices while incarcerated in controlled environment 101 provided they meet the strict conditions for their use. BYO device manager 311 imposes those conditions and ensures that any mobile devices meet the conditions. BYO device manager 311 performs a prescreening process to prepare BYO devices for use within controlled environment as a dual-mode mobile device 200.

In some embodiments, BYO device manager 311 coordinates the installation of client control software onto dual-mode mobile device 200. Once installed, BYO device manager 311 communicates with client control subsystem 234 to coordinate the prescreening process. BYO device manager 311 establishes a monitoring session with client control subsystem 234 in order to monitor all activity of BYO device. In an embodiment, the monitoring session is established over network 102. BYO device manager 311 further downloads an inmate profile 331 associated with the inmate using dual-mode mobile device 200 and any global rules of the controlled environment. In some embodiments, BYO device manager 311 retrieves inmate profile 331 from database 330.

BYO device manager 311 monitors usage and activity of mobile devices by requiring mobile devices to stream data over the monitoring session. For example, BYO device manager 311 receives notifications from client control subsystem 234 regarding execution of files on dual-mode mobile device 200. In some embodiments, client control subsystem 234 transmits data generated by executed files (e.g., an application) for storage at BYO device manager 311. BYO device manager 311 can monitor in real-time the usage of applications or files on mobile devices. In some embodiments, BYO device manager receives from client control subsystem 234 data transmitted from executed files (e.g., an application) with inserted tags to indicate the execution rules and/or containers in which the files are located. Rule manager 314 examines the tag, retrieves the execution rule indicated by the tag, and either allows or denies further transmission of the call data based on the execution rules. For example, data can include an email or text message, and a rule associated with the inmate profile 331 can indicate that the inmate is not allowed to transmit messages after a certain time of day. Rule manager 314 determines whether transmitting the message would meet the conditions of the rule and either allows or permits the transmission based on the determination.

As discussed above, client control subsystem 234 analyzes files stored in BYO devices and, based on rules associated with the inmate profile and global rules established by controlled environment. Container control subsystem 312 coordinates with client control subsystem 234 to manage and monitor the establishment of containers on BYO devices. Compared to mobile devices provided and owned by controlled environment 101, BYO devices require additional monitoring and control given the presence of files and applications that were installed onto the mobile device outside of controlled environment. Accordingly, container control subsystem 312 and client control subsystem 234 prevent the usage of restricted files and applications are not used within controlled environment.

Download manager 313 controls the download of software and updates to mobile devices in controlled environment 101. For example, download manager 313 pushes client control applications and over-the-air wireless updates to the mobile devices. Rule manager 314 manages execution rules associated with containers in each wireless device and global rules of controlled environment 101. Download manager 313 and rule manager 314 coordinate to download execution rules to dual-mode mobile device 200.

In some embodiments, authentication subsystem 315 performs authentication functions for establishing calls within dual-mode call management system 100. Authentication subsystem 315 receives authentication information from inmates and outside participants to the call. Authentication information can include but is not limited to at least one of a username and password data, challenge questions, challenge answers, biometric data, device data such as make and model of a communication device, and/or location data. Biometric data includes one or more of a finger print, a hand print, a voice sample, an iris or retinal sample, a facial image of the user (2D or 3D), a gait identification, a hand geometry, a signature identification, an infrared camera identification, or any other biometric as deemed appropriate.

In some embodiments, dual-mode call system 320 includes connection manager 321, handoff subsystem 322, and call monitor 323. Connection manager 321 manages connections of mobile devices within controlled environment 101 including those over network 102 and network 103. Connection manager 321 coordinates with BYO device manager 311 to monitor data and activity of mobile devices through establishment of the monitoring session between dual-mode mobile device 200 and monitoring server 300. In some embodiments, all monitoring functions can be formed by either connection manager 321 or BYO device manager 311.

Handoff subsystem 322 manages handoffs of calls between network 102 and network 103. Handoff subsystem 322 transmits handoff messages over network 102 to dual-mode mobile device 200 that provide authorized for dual-mode mobile device 200 to conduct a call over network 103 with cellular provider 130. Handoff subsystem 322 allows dual-mode mobile device 200 to initiate a call over a first network connection, such as network 102, but conduct the call over a second network connection, such as network 103 if the inmate making the request and/or the mobile device associated with the request is determined to be allowed to make such calls. In an embodiment, the first network connection is a Wi-Fi connection and the second network connection is a cellular (e.g., GSM, CDMA, 3G, 4G, 5G) connection. Handoff messages, which are transmitted over the first connection, from handoff subsystem 322 controls dual-mode mobile device 200 to conduct the call with cellular provider 130.

Handoff subsystem 322 also coordinates with connection manager 321 and BYO device manager 311 to establish a mirroring session over the first connection. The mirroring session is established either concurrently with or after dual-mode mobile device 200 establishes a call over the second connection with cellular provider 130. For example, the handoff message further controls client control subsystem 234 to transmit data of the call through both Wi-Fi interface 222 to monitoring server 120 and cellular interface 223 to cellular provider 130. In this manner, connection manager 321 and BYO device manager 311 monitor communications taking place over the call through data transmitted through the mirroring session. Data transmitted through the mirroring session and the call are identical. In some embodiments, handoff subsystem 322 transmits a notification to connection manager 321 and BYO device manager 311 indicating that a handoff is taking place.

Call monitor 323 monitors and analyzes on-going or recorded calls (e.g., stored in database 330) and performs predetermined actions based on the monitoring. Monitoring by call monitor 323 includes performing visual analysis on video calls and audio analysis on video and audio-only calls. Monitoring can be performed in real-time with on-going calls or with stored calls. In some embodiments, database 330 includes areas short-term and long-term storage. In an embodiment, short-term storage stores calls that require more immediate review or approval. For example, calls that triggered notifications are flagged for more immediate approval or review by authorized personnel of controlled environment 101 are stored in short-term memory. Conversely, calls that do not require immediate review or approval (or not require review or approval at all) are stored in long-term storage.

Visual analysis can include performing object identification and biometric analysis of the participants during the call. Object identification includes analyzing video frames to determine objects present during the video call. Biometric analysis includes analyzing facial, retinal, and other visual features of participants in the video call to determine identities of all participants. Call monitor 323 also coordinates with rules 332 to perform predetermined actions based on the visual analysis. For example, one rule may trigger a notification when a determined identity of a participant does not match with an identifier of the participant that was used to establish the call. The trigger can be sent to an administrator who can confirm or deny the results of the analysis.

Audio analysis of video and audio calls includes voice analysis and content analysis of the conversations taking place during the call. Voice analysis includes comparing voices detected during the call with voices expected to be heard on the call based on, for example, an identifier of the participant that was used to establish the call. Content analysis includes detecting and transcribing the words spoken by all participants during the call and performing any predetermined actions as determined by associated administrative rules. For example, an administrative rule may trigger a notification when certain phrases or words are detected during the call.

In an embodiment, inmate profiles 331 classify certain outside parties as privileged parties or parties with whom calls with the inmate are privileged. For example, an inmate profile identifies an inmate's attorney, such as through the attorney's contact information. In an embodiment, authorized personnel of controlled environment approve privileged parties before they are added to inmate profiles 331. Call monitor 323 could identify calls based on, for example, contact information included in a call request, as being privileged. Accordingly, in monitoring calls, call monitor 323 determines whether a call qualifies as a privileged communication. If the call qualifies as a privileged communication, then call monitoring does not take place.

Database 330 includes any number of databases and/or servers, and stores and organizes data in a relational database. Database 330 runs a database management system, such as MySQL™, to provide an example. Database 330 includes inmate profiles 331 and rules 332. Inmate profiles 331 store information associated with each inmate including files associated with the inmate. For example, inmate profiles 331 can identify files such as applications and games associated with the inmate. This may include files purchased by the inmate and files provided to the inmate by controlled environment 101. Inmate profiles 331 can also include rules regarding files that can be used by the inmate. For example, administrators of controlled environment 101 may want to limit the inmate's access to certain files or provide a schedule for when the inmate may access files. Information in inmate profiles 331 are utilized to generate execution rules that generate the appropriate containers for the wireless device used by the inmate.

As a non-limiting example, inmate profiles 331 specify that an inmate owns a game and a video conference application. Inmate profiles 331 also include rule specifying that an inmate is not allowed access to any video conference application (e.g., because the inmate has lost his calling privileges) and an administrative restriction specifying that the game can only be access during the day. Execution rules can be generated based on the identified files and the administrative restrictions. MMDM 310 can then transmit the generated execution rules to the wireless device of the inmate.

All rules 332 including execution rules and global rules are stored in database 330. Rules 332 can further specify permissible or restricted actions that can be performed by inmates of the controlled environment as related to a call. In this manner, administrative rules can be inmate-specific or global (i.e., apply to all inmates of the controlled environment). For example, administrative rules can reference whitelists or blacklists that include identifiers of contacts. A whitelist can be global, specific to the inmate, or specific to a group of inmates and can include identifiers of contacts that are allowed to be added to a conference PAN list. A blacklist can be global, specific to the inmate, or specific to the group of inmates and can include identifiers of contacts that are not allowed to be added to a conference PAN list. Discussion of administrative rules are merely exemplary and other administrative rules are within the scope of the invention. Additionally, administrative rules can specify permissible and/or restricted actions that apply to specific monitored conference devices, specific types of monitored conference devices (e.g., all tablets, all smart phones), or all monitored conference devices. For example, an administrative rule to a specific type of monitored conference device can be a restriction on certain content from being downloaded onto all generic smartphones.

Database 330 further stores all calls that occur within dual-mode call management system 100. The stored calls may be later analyzed or provided to a monitoring system, such as monitoring server 120, for later analysis. Database 330 also includes biometric and authentication information of all inmates within the controlled environment. Moreover, database 330 can also include biometric information of any outside party approved to participate in the call functionality within the controlled environment.

Exemplary Dual-Mode Call Management System Operation

Exemplary usage of dual-mode call management system 100, dual-mode mobile device 200, and monitoring server 300 in a controlled environment will be described with respect to FIGS. 4-9. The exemplary usage described in FIGS. 4-9 can be performed by processing logic that can comprise hardware (e.g., circuitry, dedicated logic, programmable logic, microcode, etc.), software (e.g., instructions executing on a processing device), or a combination thereof. For illustrative purposes, FIGS. 4-9 are described with respect to FIGS. 1-3 but are not limited to these example embodiments. The methods described in FIGS. 4-9 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIGS. 4-9, as will be understood by a person of ordinary skill in the art. Additionally, some steps can be combined with steps of methods from other figures and performed as a single step.

Figure 4:
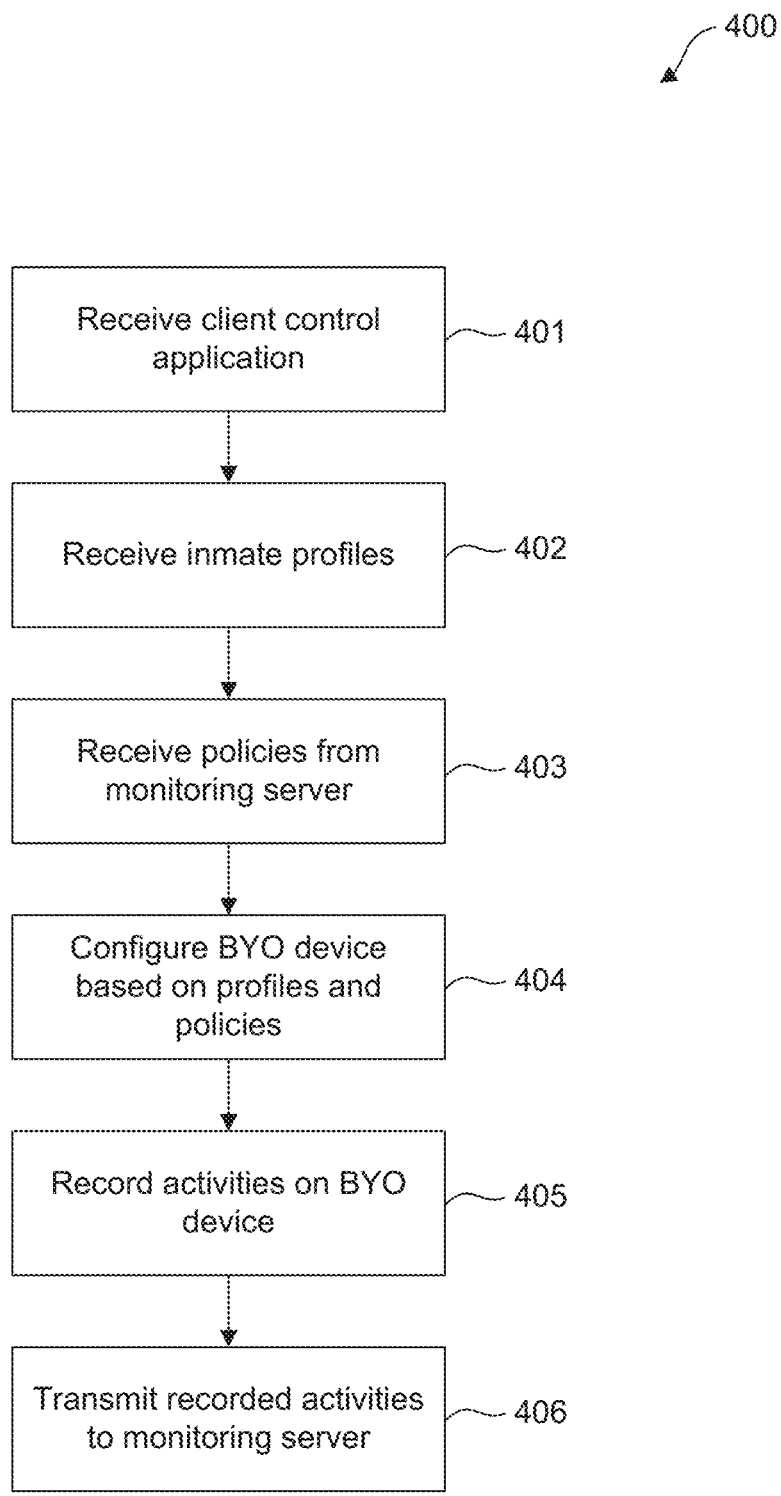
FIG. 4 illustrates a flowchart diagram of an exemplary method for installing a client control application in an exemplary dual-mode mobile device of FIG. 2, according to embodiments of the present disclosure.

FIG. 4 illustrates a flowchart diagram of an exemplary method 400 for installing a client control application in an exemplary dual-mode mobile device of FIG. 2, according to embodiments of the present disclosure. In some embodiments, method 400 can be performed by dual-mode mobile device 200.

In 401, dual-mode mobile device 200 receives a client control application from monitoring server 300. In some embodiments, dual-mode mobile device 200 receives the client control application when the dual-mode mobile device 200 is prepared for use within controlled environment 101. For example, if dual-mode mobile device 200 is a BYO device, after the inmate consents to the policies and requirements of the jurisdiction including signing a consent form waiving their fourth amendment rights as to privacy regarding information and communications on their device, monitoring server 300 downloads the client control application onto dual-mode mobile device 200. In another embodiment, dual-mode mobile device 200 connects to monitoring server 300 through another device, such as a kiosk. Accordingly, either monitoring server 300 or kiosk are capable of downloading the client control application onto dual-mobile device 200. For example, controlled environment 101 can require dual-mode mobile device 200 to connect to monitoring server 300 or kiosk (such as through communication interfaces 220) prior to dual-mode mobile device 200 being used within controlled environment. In this manner, the combination of monitoring server 300 (or a kiosk) with client control application allows automated configuration of dual-mobile mobile device 200. Dual-mode mobile device 200 installs the client control application into client control subsystem 234.

In 401, dual-mode mobile device 200 further receives an inmate profile associated with the inmate currently using dual-mode mobile device 200 from monitoring server 300. In some embodiments, dual-mode mobile device 200 provides an identifier associated with the inmate to monitoring server 300 which uses the identifier in order to determine the inmate profile to transmit to dual-mode mobile device 200. As described above, inmate profile includes a blacklist and a PAN list associated with the inmate as well as any files or applications associated with the inmate. For example, the inmate profile can identify applications and games that the inmate has purchased.

In 401, dual-mode mobile device 200 further receives any rules such as inmate-specific rules and global rules associated with controlled environment 101. As described above, inmate-specific rules are administrative restrictions placed on the inmate's ability to use files on dual-mode mobile device 200. For example, administrators of controlled environment 101 may want to limit the inmate's access to certain files or provide a schedule for when the inmate may access certain files.

In 402, client control subsystem 234 configures dual-mode mobile device 200 based on the downloaded inmate profile and rules. As previously discussed, configuration of dual-mode mobile device 200 includes analyzing files in file system 230, generating containers based on the inmate profile and rules, and organizing the files into the generated containers based on the inmate profile and rules. As an example, an inmate's profile specifies the files available to the inmate and rules specify any restrictions as to how the files can be executed by the inmate. Containers are generated and associated with an execution rule. Files are then allocated into the respective container based on the rules provided monitoring server 300. Execution rules can also include a list of files that are banned from being executed within controlled environment 101. For example, execution rules can specify that certain video calling applications, browser applications, games, or network applications are to be placed within a locked container with restricted access while dual-mode mobile device 200 is connected to a network in controlled environment 101.

After configuration by client control subsystem 234, dual-mode mobile device 200 is ready for use within controlled environment 101. In embodiments where dual-mode mobile device 200 is a BYO device, configuration of files into containers is a prerequisite for use within controlled environment 101. For either a BYO device or a device provided by controlled environment 101, installation of the client control application into client control subsystem 234 is a prerequisite for use of dual-mode mobile device 200 for use within controlled environment 101.

In 403, client control subsystem 234 begins recording any activities performed by the inmate. Activities include all actions performed by the inmate through dual-mode mobile device 200 including the inmate interacting with any files or applications, any communications transmitted or received by dual-mode mobile device 200. In 404, client control subsystem 234 transmits the recorded activities to monitoring server 300. In some embodiments, transmitting the recorded activities occurs in real-time as part of a streaming session between dual-mode mobile device 200 and monitoring server 300.

Figure 5:
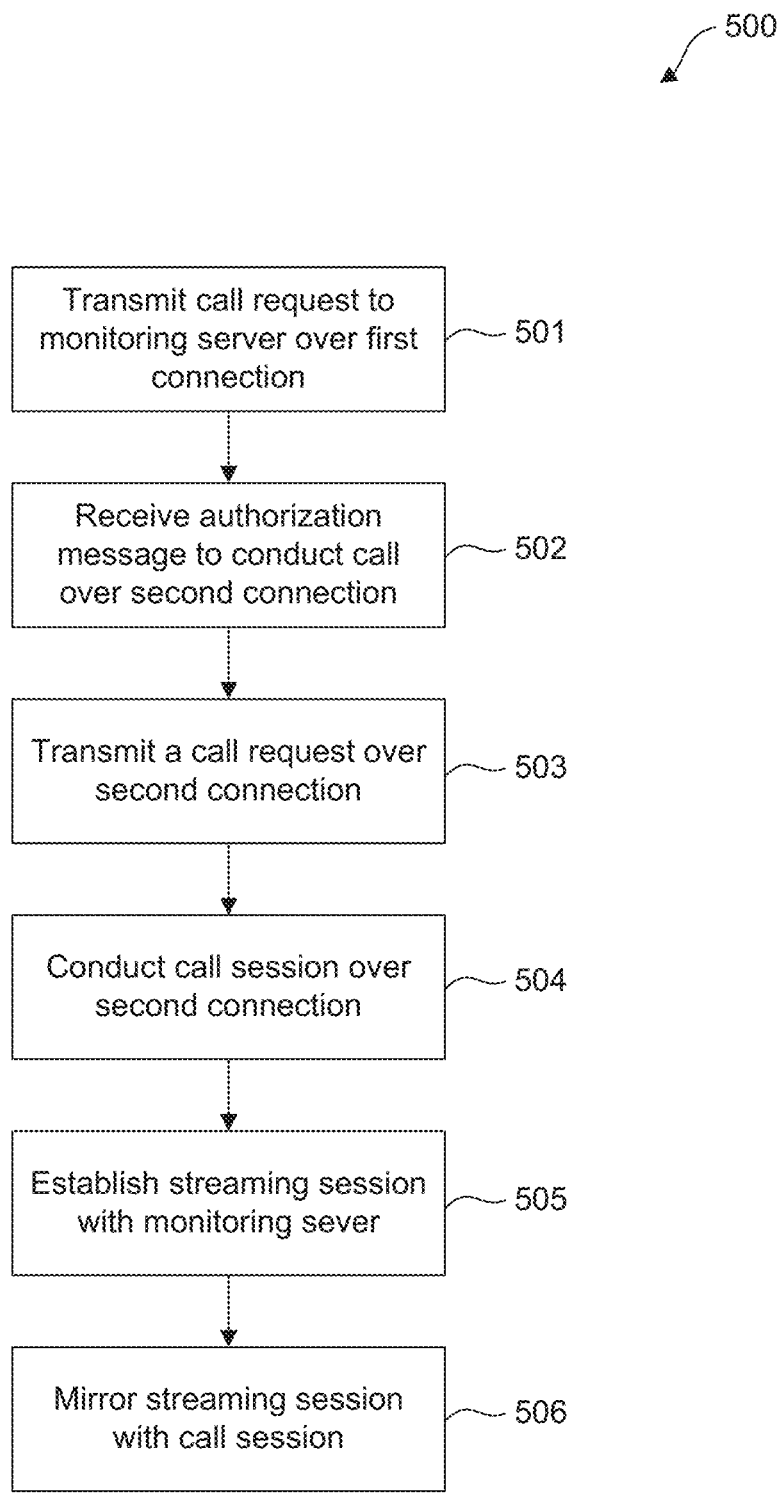
FIG. 5 illustrates a flowchart diagram of an exemplary method for establishing an out-going call for the exemplary dual-mode mobile device of FIG. 2 in the exemplary dual-mode call management system of FIG. 1, according to embodiments of the present disclosure.

FIG. 5 illustrates a flowchart diagram of an exemplary method 500 for establishing an out-going call for the exemplary dual-mode mobile device of FIG. 2 in the exemplary dual-mode call management system of FIG. 1, according to embodiments of the present disclosure. Method 500 can be performed by dual-mode mobile device 200.

In 501, dual-mode mobile device 200 transmits a call request for a video or audio (e.g., telephone) call to monitoring server 300 over a first connection. In some embodiments, the call request is a request to conduct an outgoing call with an outside party over a second connection which is a different connection than the first connection. In some embodiments, the first connection is a Wi-Fi connection between dual-mode mobile device 200, access point 111, and monitoring server 300 and the second connection is a cellular connection between dual-mode mobile device 200, cellular provider 130, and outside device 140. The call request includes information necessary to establish the call including but not limited to an inmate identifier, an indication that the inmate wishes to conduct the call over the second connection (instead of the first connection), and a number of outside device 140. The inmate identifier is necessary for the monitoring server 300 to retrieve information about the inmate and verify that the inmate is authorized to make calls over the second connection, that the inmate is authorized to call the number of outside device 140 (e.g., comparing to the inmates PAN list), and the call over the second connection is allowed based on any rules provided by controlled environment 101.

In 502, dual-mode mobile device 200 receives an authorization message from monitoring server 300 indicating that dual-mode mobile device 200 may conduct the call through cellular provider 130 over the second connection. In some embodiments, the authorization message includes handoff information that instructs handoff subsystem 235 of dual-mode mobile device 200 to establish the call with cellular provider 130.

In 503, based on the authorization message, handoff subsystem 235 transmits another call request over the second connection to cellular provider 130. This call request includes information necessary to establish the call including the outside phone number. In 504, after the call has been established over the second connection through cellular provider 130, dual-mode mobile device 200 conducts the call session with outside device 140.

In 505, dual-mode mobile device 200 establishes a mirroring session over the first connection with monitoring server 300. In some embodiments, client control subsystem 234 establishes the mirroring session concurrently with the establishment of the call session between dual-mode mobile device 200 and cellular provider 130. In some embodiments, the mirroring session is established subsequent to the establishment of the call session. The mirroring session allows dual-mode mobile device 200 to stream or transmit call data from the call session (between dual-mode mobile device 200 and cellular provider 130) to monitoring server 300.

In 506, dual-mode mobile device 200 transmits or streams call data from the call session over the mirroring session to monitoring server 300. In some embodiments, dual-mode mobile device 200 streams the call data over the mirroring session in real-time. For example, dual-mode mobile device 200 transmits any data that is transmitted or received in the call session from cellular provider 130 over the second connection to monitoring server 300 over the second connection. In some embodiments, dual-mode mobile device 200 records the call and transmits the call data over the first connection to monitoring server 300 after the call is completed. In some embodiments, client control subsystem 234 monitors an ongoing call and upon detecting of a trigger condition (e.g., based on biometric analysis or word recognition) transmits a notification to monitoring server 300. Client control subsystem 234 can also begin streaming the call upon detection of the trigger condition.

Figure 6:
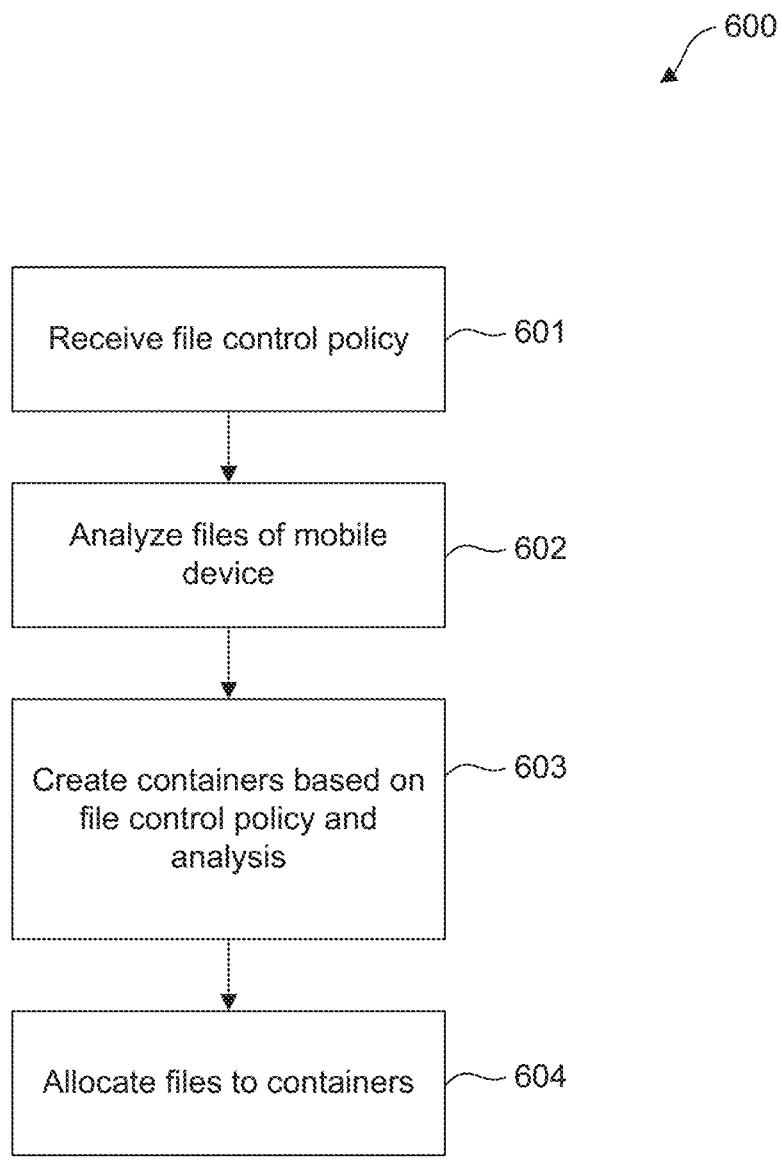
FIG. 6 illustrates a flowchart diagram of an exemplary method for implementing containers in an exemplary dual-mode mobile device of FIG. 2 in the exemplary dual-mode call management system of FIG. 1, according to embodiments of the present disclosure.

FIG. 6 illustrates a flowchart diagram of an exemplary method 600 for implementing containers in an exemplary dual-mode mobile device of FIG. 2 in the exemplary dual-mode call management system of FIG. 1, according to embodiments of the present disclosure. Method 600 can be performed by dual-mode mobile device 200. Method 600 is exemplary of the configuration of a BYO device performed in 404 of FIG. 4.

In 601, dual-mode mobile device 200 receives a file control policy from monitoring server 300. A file control policy is a type of rule that specifies conditions in which files and applications are allowed to be used on dual-mode mobile device 200 and includes instructions for generating containers consistent with the conditions. For example, in some embodiments, the file control policy includes permitted applications, restricted applications, permitted files (e.g., songs, movies), and restricted files. The file control policy controls dual-mode mobile device 601 to generate containers based these conditions (e.g., a container that allows access by the inmate and a container that denies access by the inmate). As previously noted, in some embodiments, dual-mode mobile device 200 receives the file control policy when the inmate enters controlled environment 101.

In 602, dual-mode mobile device 200 analyzes files and applications based on the file control policy. This analysis includes comparing the files and applications on dual-mode mobile device 200 with the files and applications specified in the file control policy. For example, in some embodiments, the file control policy specifies that all video conference applications are restricted from use while dual-mode mobile device 200 is within controlled environment 101 to prevent the inmate from conducting video calls unless it is through a video conference application authorized and provided by controlled environment 101. Accordingly, in 602, dual-mode mobile device 200 identifies all currently installed video calling applications.

In 603, dual-mode mobile device 200 creates containers based on the file control policy and the results of the analysis of 602. In 604, dual-mode mobile device 200 allocates files identified in 602 to the generated containers. Containers are associated with execution rules which specify how any files allocated to the containers are to be executed. Examples of execution rules include but are not limited denying access by the inmate, permitting access by the inmate, and conditional access. Continuing the video calling example above, dual-mode mobile device 200 generates a container that restricts any access to files and allocates all identified video calling applications to the generated container.

Figure 7:
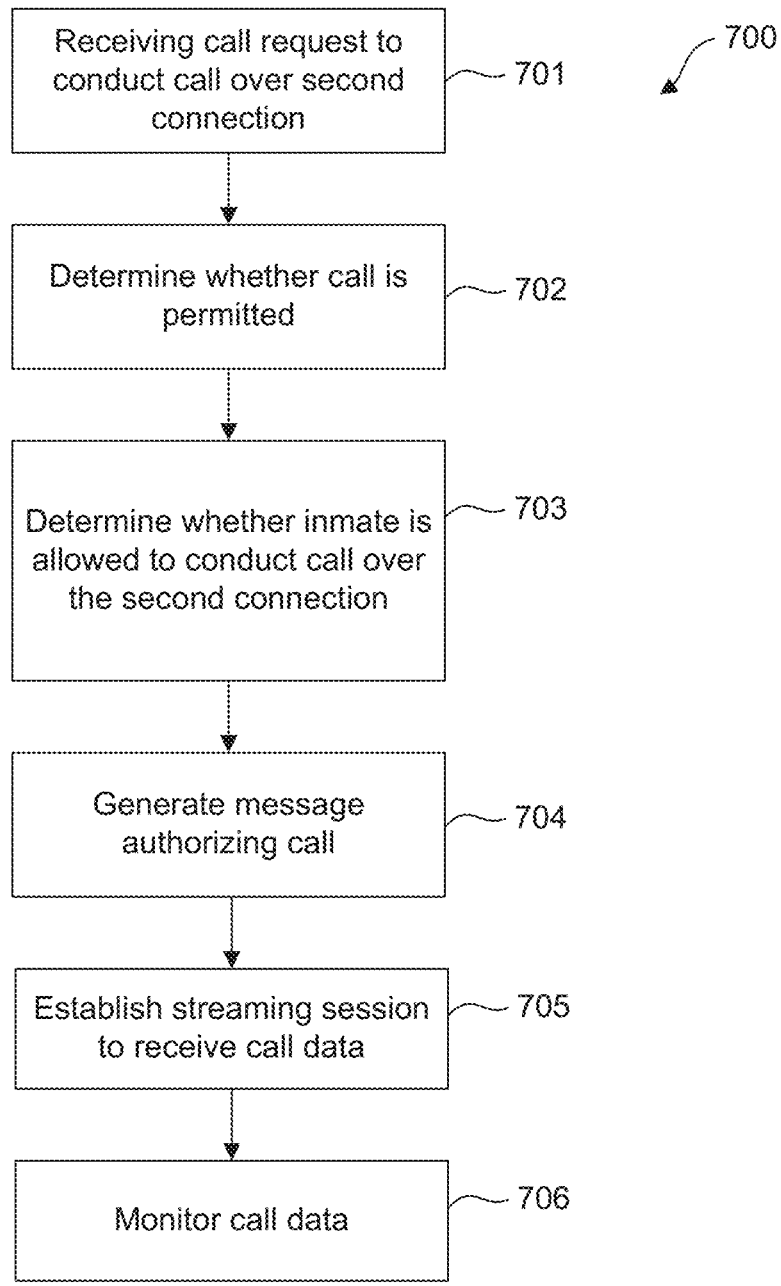
FIG. 7 illustrates a block diagram of an of an exemplary method for establishing an incoming call with an exemplary monitoring server of FIG. 3 in the exemplary dual-mode call management system of FIG. 1, according to embodiments of the present disclosure.

FIG. 7 illustrates a block diagram of an of an exemplary method 700 for establishing an incoming call with an exemplary monitoring server of FIG. 3 in the exemplary dual-mode call management system of FIG. 1, according to embodiments of the present disclosure. Method 700 can be performed by monitoring server 300.

In 701, monitoring server 300 receives a call request to conduct a call over a second connection, such as a cellular connection. In some embodiments, the call is either a video or audio call. In some embodiments, the call request is received from mobile device operated by an inmate of controlled environment 101 such as dual-mode mobile device 200 or from a mobile device operated outside of controlled environment 101 such as outside device 140. The call request includes information for establishing the call including information identifying the calling party as well as information of the called party. In embodiments where dual-mode mobile device 200 is a BYO device, the call request includes an identifier of the inmate. Monitoring server 300 retrieves an inmate profile associated with the identifier. The inmate profile includes call permissions associated with the inmate including call such as but not including whether the inmate is permitted to make calls, whether the inmate is permitted to make calls over a cellular connection, time periods when the inmate is permitted to make the call, a blacklist (e.g., contacts whom the inmates are not allowed to contact), and a PAN list.

In 702, monitoring server 300 determines whether the call is permitted. In some embodiments, this determination is based on the permissions in the inmate profile. For example, monitoring server 300 determines whether the inmate is allowed to make any calls either over the first or second connection. As another example, another permissions relates to permitted time periods for the call (e.g., inmate is only allowed to make calls between 9:00 AM to 4:00 PM).

In 703, monitoring server 300 determines whether the inmate is permitted to conduct the call over the second connection, such as a cellular connection. In other words, the inmate may be permitted to make a call over the first connection, such as the Wi-Fi connection, but not over the cellular connection.

In 704, if the inmate is permitted to conduct the call over the second connection, monitoring server 300 generates a message authorizing the call. The message includes information that instructs handoff subsystem 235 to establish the call over the second connection through cellular provider 130. Monitoring server transmits the authorization message to dual-mode mobile device 200.

In 705, monitoring server 300 establishes a streaming session with dual-mode mobile device 200 in order to mirror the call between dual-mode mobile device 200 and cellular provider 130. Mirroring the call refers to receiving the same call data that is transmitted and received through the call session between dual-mode mobile device 200 and cellular provider 130. The call data includes any data that is transmitted or received by dual-mode mobile device 200 including voice data. In 706, monitoring server 300 monitors the call data including voice data. In some embodiments, monitoring server 300 allows an administrator to see or listen to the same conversation that is taking place during the call between dual-mode mobile device 200 and monitoring server 300.

Figure 8:
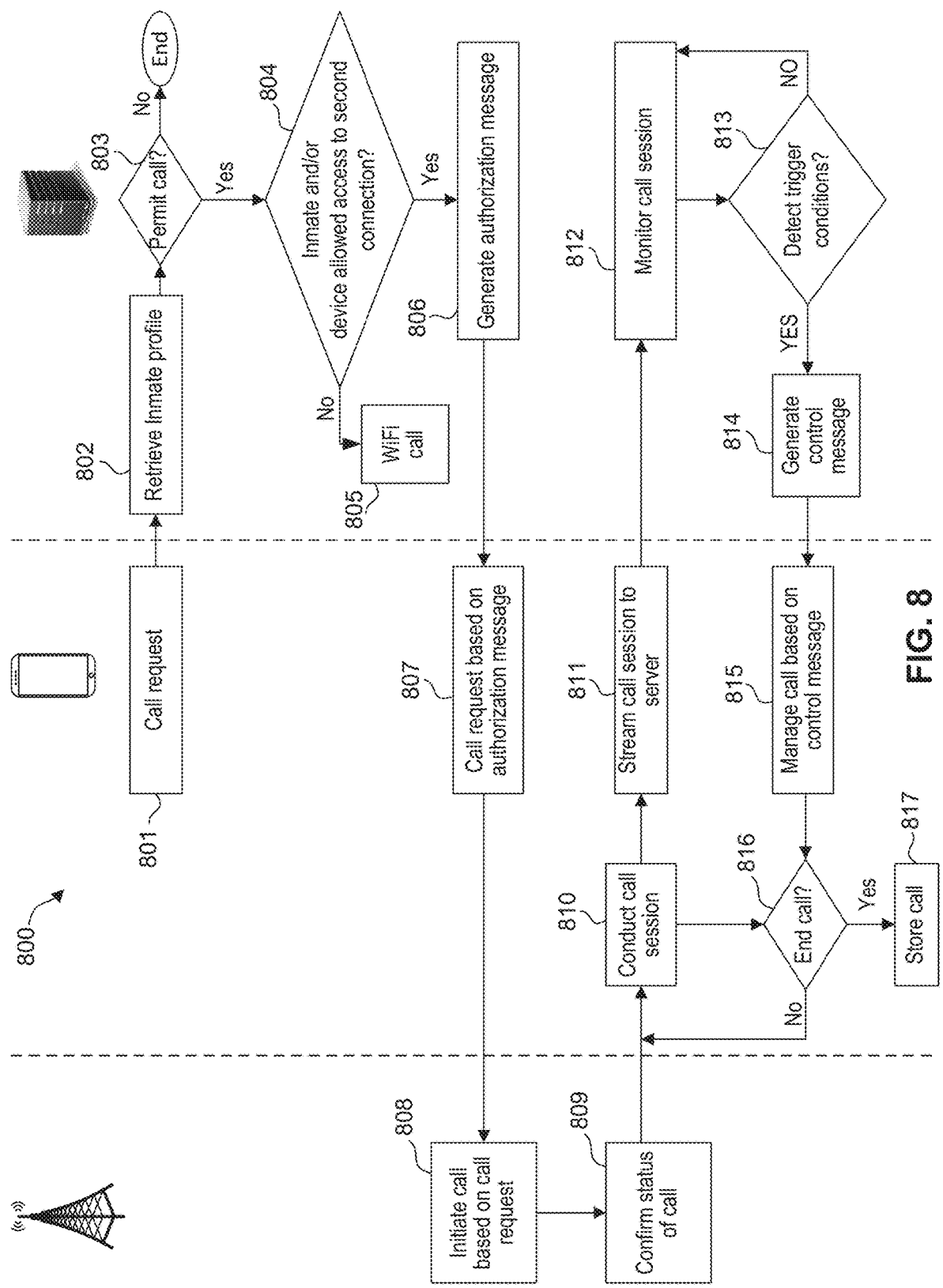
FIG. 8 illustrates a block diagram of an exemplary method for establishing an outgoing call with a cellular provider in the exemplary dual-mode call management system of FIG. 1, according to embodiments of the present disclosure.

FIG. 8 illustrates a block diagram of an exemplary method 800 for establishing an outgoing call with a cellular provider in the exemplary dual-mode call management system of FIG. 1, according to embodiments of the present disclosure.

Method 800 can be performed by cellular provider 130, dual-mode mobile device 200, and monitoring server 300.

In 801, dual-mode mobile device 200 transmits a call request to monitoring server 300 over a first connection, such as network 102. In some embodiments, the first connection is a Wi-Fi connection. The call request is to conduct an outgoing call over a second connection, such as network 103, with cellular provider 130. In some embodiments, the second connection is a cellular connection. In 802, based on information in the call request, monitoring server 300 retrieves an inmate profile associated with the inmate operating dual-mode mobile device 200. For example, in some embodiments, the inmate is required to sign into dual-mode mobile device 200 and any communications from dual-mode mobile device 200 includes the inmate's identifier which allows monitoring server 300 to track and monitor use of dual-mode mobile device 200 by the inmate.

In 803, monitoring server 300 determines whether to permit the call. In some embodiments, this determination is based on retrieving the inmate's profile and determining the permissions associated with the inmate and global rules associated with controlled environment 101. For example, some inmates may have blacklists which include numbers to which the inmate are not allowed to have calls or inmates may be entirely restricted from making outgoing calls. As another example, a global rule can be established that restricts any outgoing calls from any inmates during a specific period of day. In some embodiments, the determination includes verifying that the phone number of outside device 140 with a PAN list associated with the inmate. If the call is not permitted, monitoring server 300 denies the request and the method ends.

If a call is permitted, in 804, monitoring server 300 next determines whether a call over the second connection is permitted. In some embodiments, this determination is based on the inmate's profile and rules associated with the inmate and controlled environment 101. For example, some inmates may be allowed to make outgoing calls but are not allowed to do so over the second connection. As another example, dual-mode mobile device 200 may not be approved by controlled environment 101 to make calls over the second connection.

In 805, monitoring server 300 has determined that the inmate is permitted to make an outgoing call but is not permitted to make the outgoing call over the second connection. Accordingly, monitoring server 300 proceeds with establishing a Wi-Fi call through monitoring server 300 between dual-mode mobile device 200 and outside device 140.

In 806, monitoring server 300 has determined that the inmate is permitted to make an outgoing call and is permitted to make the outgoing call over the second connection. Accordingly, monitoring server proceeds with providing authorization to dual-mode mobile device 200 to conduct the call through cellular provider 130. Monitoring server 300 generates an authorization message which instructs dual-mode mobile device 200 to establish the call over the second connection through cellular provider 130.

In 807, dual-mode mobile device 200 receives the authorization message and generates another call request directed to cellular provider 130. In some embodiments, handoff subsystem 234 performs this step of generating the call request. The call request includes information to establish the call over the second connection with outside device 140 such as the telephone number associated with outside device 140.

In 808, cellular provider 130 receives the call request from dual-mode mobile device 200 and proceeds with establishing the call over the second connection between dual-mode mobile device 200 and outside device 140. In 809, cellular provider 130 establishes the call and confirms to dual-mode mobile device 200 that the call has been established.

In 810, dual-mode mobile device 810 conducts the call with outside device 140 over the second connection with outside device 140. In 811, client control subsystem 233 establishes a mirroring session with monitoring server 300. In some embodiments, the mirroring session is established concurrently with the call between dual-mode mobile device 810 and outside device. In other embodiments, the mirroring session is established upon a trigger condition such as after the call or upon detection of an authorized voice during the call. As discussed above, the purpose of the mirroring session is stream call data that is transmitted between dual-mode mobile device 200 and outside device 140 during the call over the second connection to monitoring server 300 over the first connection.

In this manner, in 812, monitoring server 300 monitors the call through analyzing the call data receives from dual-mode mobile device 200 over the mirroring session. In some embodiments, monitoring the call session is performed manually. For example, authorized personnel listen into the call in real-time as the call is on-going. In some embodiments, monitoring the call session is performed in an automated manner such as through biometric analysis and word recognition which are discussed above.

In 813, monitoring server 300 determines whether any trigger conditions are detected while monitoring the call. Trigger conditions are specified by rules 332 in monitoring server 300 and include but are not limited detected events that occur during the call. For example, biometric analysis of a call may detect a change in voice during the call which could indicate an unauthorized party. This is a trigger condition which can be used to send a notification to authorized personnel to confirm the detection and/or to terminate the call.

If a trigger condition is detected, monitoring server 300 generates a control message in 814. Examples of a control message include but are not limited to a notification to authorized personnel, generating a warning that is heard by parties of the call, and terminating the call entirely. The control message instructs client control subsystem 233 to manage the call in accordance with the trigger conditions detected by monitoring server 300. In 815, dual-mode mobile device 200 receives the control message and manages the call based on the instructions in the control message.

In 816, dual-mode mobile device determines whether the parties have ended the call. If not, monitoring the call as described above with regard to 810-815 continues. If so, client control subsystem 233 ends the call. In 817, call data is stored and can later be transmitted to monitoring server 300.

Figure 9:
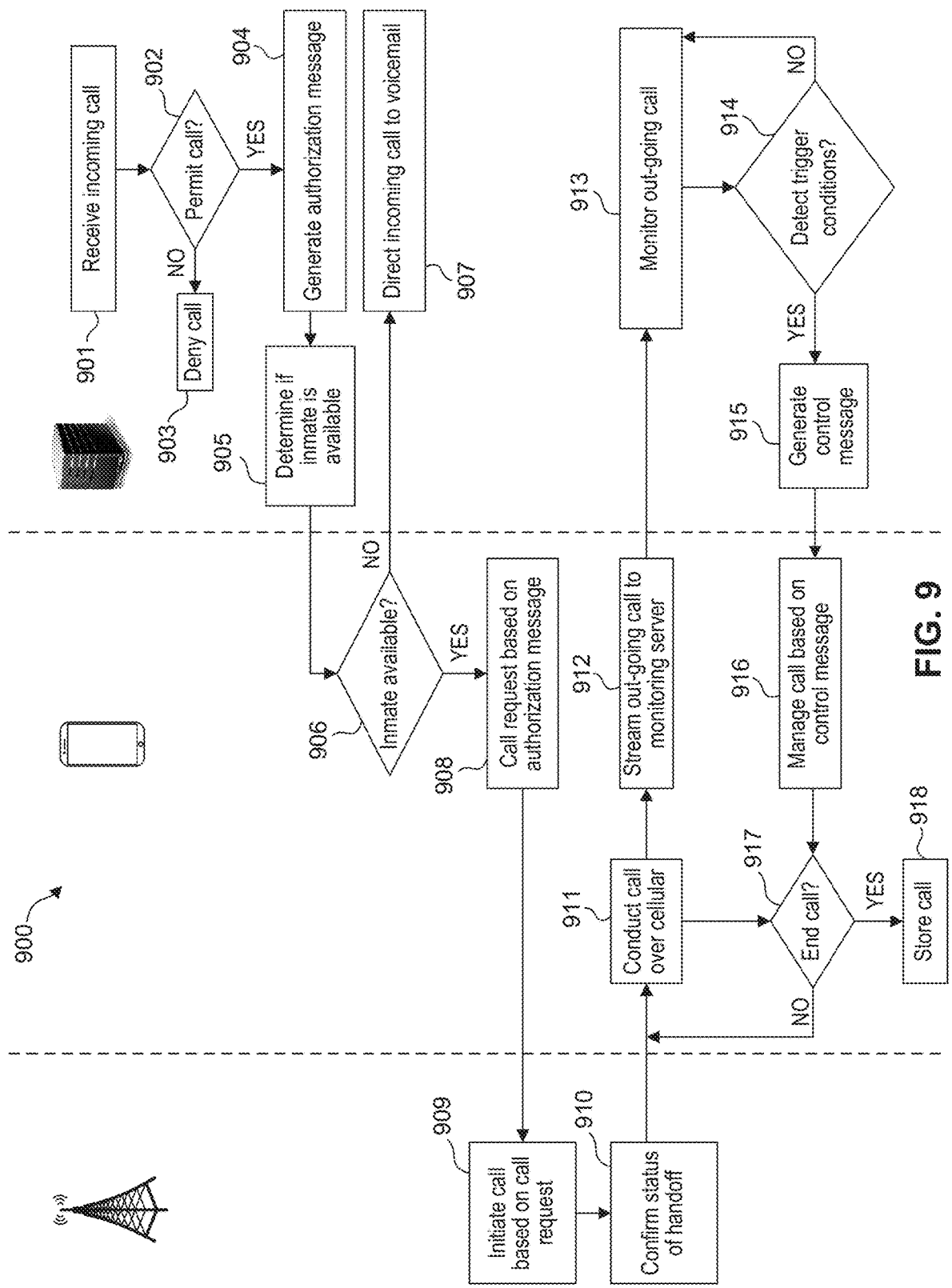
FIG. 9 illustrates a block diagram of an exemplary method for establishing an incoming call with a cellular provider in the exemplary dual-mode call management system of FIG. 1, according to embodiments of the present disclosure.

FIG. 9 illustrates a block diagram of an exemplary method 900 for establishing an incoming call with a cellular provider in the exemplary dual-mode call management system of FIG. 1, according to embodiments of the present disclosure. Method 900 can be performed by cellular provider 130, dual-mode mobile device 200, and monitoring server 300.

In 901, monitoring server 300 receives an incoming call request from a device outside of controlled environment 101 such as outside device 140. Because it is operated by a user outside of controlled environment 101, outside device 140 is generally associated with a cellular provider such as cellular provider 130. Accordingly, the incoming call request is for establishing a call over a second connection, such as through network 103, through cellular provider 130 between dual-mode mobile device 200 and outside device 140. In some embodiments, the incoming call request includes an identifier such as a phone number that is associated with an inmate of controlled environment 101.

In 902, monitoring server 300 determines whether to permit the call. This determination is based on permissions associated with the inmate identified in the incoming call request and is similar to the analysis described above with respect to 803 and 804. If monitoring server 300 determines that the call is not permitted (e.g., for the inmate is not allowed to receive calls, controlled environment 101 does not allow calls as this time of day, the inmate is not allowed to conduct calls over the second connection), monitoring server 300 denies the call at 903.

In 904, monitoring server 300 determines that the call to the inmate is permitted and generates an authorization message. The authorization message includes information that enables dual-mode mobile device 200 to establish the call with outside device over the second connection through cellular provider 130. In some embodiments, the authorization message includes instructions to handoff subsystem 234 to perform a handoff between the call established over the first connection to a call established over the second connection.

In 905, monitoring server 300 determines whether the inmate is available by calling the inmate at dual-mode mobile device 200 over the first connection, such as network 102, and transmitting the authorization message. In 906, dual-mode mobile device 200 receives the call from monitoring server 300. If the inmate is not available (e.g., does not pick up the phone), monitoring server 300 directs outside device 140 to the inmate's voicemail at 907.

If the inmate is available (e.g., picks up the phone), in 908, dual-mode mobile device 200 initiates a call request based on the instructions in the authorization message. The call request is directed to cellular provider 130 for establishing a call over a second connection between dual-mode mobile device 200 and outside device 140 through cellular provider 130. In some embodiments, monitoring server 300 establishes the call between dual-mode mobile device 200 and outside device 140 over the first connection. The authorization message includes instructions to dual-mode mobile device perform a handoff of the call from the first connection to the second connection. Handoff subsystem 234 proceeds to handoff the call from the first connection to the second connection.

In 909, cellular provider 130 initiates the call over the second connection to dual-mode mobile device 200. In some embodiments, this includes coordinating the handoff of the call from the first connection (between dual-mode mobile device 200 and monitoring server 300) to the second connection (between dual-mode mobile device 200 and cellular provider 130). In 910, cellular provider 130 provides confirmation that the call over the second connection has been successfully established.

In 911, dual-mode mobile device 810 conducts the call with outside device 140 over the second connection with outside device 140. In 912, client control subsystem 233 establishes a mirroring session with monitoring server 300. As discussed above, the purpose of the mirroring session is to stream call data that is transmitted between dual-mode mobile device 200 and outside device 140 during the call over the second connection to monitoring server 300 over the first connection.

In this manner, in 913, monitoring server 300 monitors the outgoing call by analyzing the call data receives from dual-mode mobile device 200 over the mirroring session. In some embodiments, monitoring the call session is performed manually. For example, authorized personnel listen into the call in real-time as the call is on-going. In some embodiments, monitoring the call session is performed in an automated manner such as through biometric analysis and word recognition which are discussed above.

In 914, monitoring server 300 determines whether any trigger conditions are detected while monitoring the call. If a trigger condition is detected, monitoring server 300 generates a control message in 915. In 916, dual-mode mobile device 200 receives the control message and manages the call based on the instructions in the control message.

In 916, dual-mode mobile device determines whether the parties have ended the call. If not, monitoring the call as described above with regard to 911-916 continues. If so, client control subsystem 233 ends the call. In 918, call data is stored and can later be transmitted to monitoring server 300.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 10:
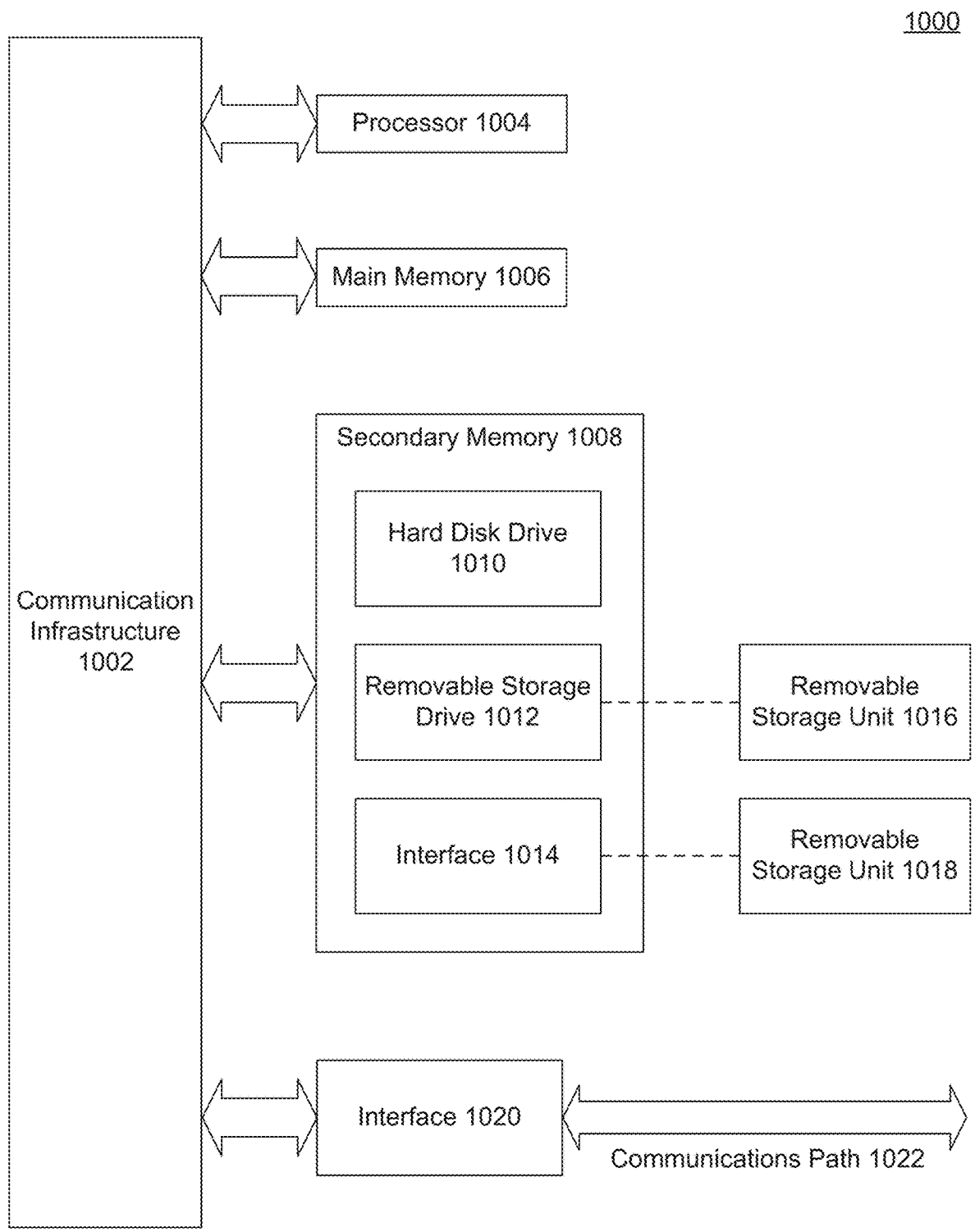
FIG. 10 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 4-7 can be implemented in the environment of one or more computer systems or other processing systems. An example of such a computer system 1000 is shown in FIG. 10. One or more of the modules depicted in the previous figures can be at least partially implemented on one or more distinct computer systems 1000.

Computer system 1000 includes one or more processors, such as processor 1004. Processor 1004 can be a special purpose or a general purpose digital signal processor. Processor 1004 is connected to a communication infrastructure 1002 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1000 also includes a main memory 1006, preferably random access memory (RAM), and may also include a secondary memory 1008. Secondary memory 1008 may include, for example, a hard disk drive 1010 and/or a removable storage drive 1012, representing a floppy disk drive, a magnetic tape drive, an optical disk drive, or the like. Removable storage drive 1012 reads from and/or writes to a removable storage unit 1016 in a well-known manner. Removable storage unit 1016 represents a floppy disk, magnetic tape, optical disk, or the like, which is read by and written to by removable storage drive 1012. As will be appreciated by persons skilled in the relevant art(s), removable storage unit 1016 includes a computer usable storage medium having stored therein computer software and/or data.

In alternative implementations, secondary memory 1008 may include other similar means for allowing computer programs or other instructions to be loaded into computer system 1000. Such means may include, for example, a removable storage unit 1018 and an interface 1014. Examples of such means may include a program cartridge and cartridge interface (such as that found in video game devices), a removable memory chip (such as an EPROM, or PROM) and associated socket, a thumb drive and USB port, and other removable storage units 1018 and interfaces 1014 which allow software and data to be transferred from removable storage unit 1018 to computer system 1000.

Computer system 1000 may also include a communications interface 1020. Communications interface 1020 allows software and data to be transferred between computer system 1000 and external devices. Examples of communications interface 1020 may include a modem, a network interface (such as an Ethernet card), a communications port, a PCMCIA slot and card, etc. Software and data transferred via communications interface 1020 are in the form of signals which may be electronic, electromagnetic, optical, or other signals capable of being received by communications interface 1020. These signals are provided to communications interface 1020 via a communications path 1022. Communications path 1022 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1016 and 1018 or a hard disk installed in hard disk drive 1010. These computer program products are means for providing software to computer system 1000.

Computer programs (also called computer control logic) are stored in main memory 1006 and/or secondary memory 1008. Computer programs may also be received via communications interface 1020. Such computer programs, when executed, enable the computer system 1000 to implement the present disclosure as discussed herein. In particular, the computer programs, when executed, enable processor 1004 to implement the processes of the present disclosure, such as any of the methods described herein. Accordingly, such computer programs represent controllers of the computer system 1000. Where the disclosure is implemented using software, the software may be stored in a computer program product and loaded into computer system 1000 using removable storage drive 1012, interface 1014, or communications interface 1020.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A method, performed by a dual-mode mobile device, for dual-mode transmission functionality within a controlled environment, comprising:
   receiving, from a monitoring server over a first connection between the dual-mode mobile device and the monitoring server, a client control application;
   transmitting, using the client control application over the first connection, a first call request to the monitoring server, wherein the first call request is a request to conduct a call between the dual-mode mobile device and an outside device located outside of the controlled environment;
   receiving, over the first connection, an authorization message from the monitoring server;
   based on the authorization message, transmitting a second call request over a second connection to establish the call;
   responsive to transmitting the second call request, establishing the call over the second connection with the outside device; and
   monitoring, by the client control application, communications during the call.

2. The method of claim 1, wherein the first connection is a Wi-Fi connection and the second connection is a cellular connection.

3. The method of claim 1, wherein the dual-mode mobile device comprises a cellular interface.

4. The method of claim 1, wherein monitoring the communications further comprises:
   detecting, based on the communications, a trigger condition by comparing the communications with at least one administrative rule associated with the monitoring server; and
   transmitting, based on detecting the trigger condition, a notification to the monitoring server.

5. The method of claim 4, further comprising:
   establishing, by the client control application based on the trigger condition, a mirroring session with the monitoring server; and
   transmitting, by the client control application, outgoing call data over the second connection to the outside device and over the mirroring session to the monitoring server.

6. The method of claim 4, further comprising:
   receiving, from the monitoring server over the first connection between the dual-mode mobile device and the monitoring server, the at least one administrative rule; and
   configuring, by the client control application, the dual-mode mobile device based on the at least one administrative rule.

7. The method of claim 4, wherein the trigger condition is a detection of certain words spoken during the communications.

8. The method of claim 1, wherein monitoring the communications further comprises:
determining an identity of a caller associated with the outside device;
determining, based on the identity of the caller, that the communications are privileged communications; and
terminating the monitoring based on determining that the communications are privileged communications.

9. The method of claim 1, wherein establishing the call with the outside device comprises:
establishing the call between the dual-mode mobile device and the monitoring server over the first connection; and
coordinating, by the client control application, a handoff of the call from the first connection to a second connection between the dual-mode mobile device and the outside device.

10. The method of claim 1, further comprising:
receiving, by the client control application, a file control policy from the monitoring server; and
creating, by the client control application, a container in a file system of the dual-mode mobile device based at least on the file control policy, wherein the file control policy specifies at least one condition regarding execution of an application installed within the container.

11. A dual-mode mobile device for operating within a controlled environment, comprising:
a memory storing a client control application; and
a processor coupled to the memory, the processor configured to:
receive, from a monitoring server over a first connection between the dual-mode mobile device and the monitoring server, the client control application;
transmit, using the client control application over the first connection, a first call request to the monitoring server, wherein the first call request is a request to conduct a call between the dual-mode mobile device and an outside device located outside of the controlled environment;
receive, over the first connection, an authorization message from the monitoring server;
transmit a second call request over a second connection to establish the call based on the authorization message;
establish the call over the second connection with the outside device responsive to transmitting the second call request; and
monitor, by the client control application, communications during the call.

12. The dual-mode mobile device of claim 11, wherein the first connection is a Wi-Fi connection and the second connection is a cellular connection.

13. The dual-mode mobile device of claim 11, wherein the dual-mode mobile device comprises a cellular interface.

14. The dual-mode mobile device of claim 11, wherein to monitor the communications, the processor is further configured to:
detect, based on the communications, a trigger condition by comparing the communications with at least one administrative rule associated with the monitoring server; and
transmit, based on detecting the trigger condition, a notification to the monitoring server.

15. The dual-mode mobile device of claim 14, wherein the processor is further configured to:
establish, by the client control application based on the trigger condition, a mirroring session with the monitoring server; and
transmit, by the client control application, outgoing call data over the second connection to the outside device and over the mirroring session to the monitoring server.

16. The dual-mode mobile device of claim 11, wherein to monitor the communications, the processor is further configured to:
perform voice recognition on the communications during the call;
determine a change in an identity of a caller of the call based on the voice recognition; and
terminate the call based on the change in the identity of the caller.

17. The dual-mode mobile device of claim 11, wherein to establish the call with the outside device, the processor is further configured to:
establish the call between the dual-mode mobile device and the monitoring server over the first connection; and
coordinate, by the client control application, a handoff of the call from the first connection to a second connection between the dual-mode mobile device and the outside device.

18. The dual-mode mobile device of claim 11, wherein the processor is further configured to:
receive, by the client control application, a file control policy from the monitoring server; and
create, by the client control application, a container in a file system of the dual-mode mobile device based at least on the file control policy, wherein the file control policy specifies at least one condition regarding execution of an application installed within the container.

19. A non-transitory computer-readable medium having instructions stored therein, which when executed by a processor cause the processor to perform operations comprising:
receiving, from a monitoring server over a first connection between a dual-mode mobile device and the monitoring server, a client control application;
transmitting, using the client control application over the first connection, a first call request to the monitoring server, wherein the first call request is a request to conduct a call between the dual-mode mobile device and an outside device located outside of a controlled environment;
receiving, over the first connection, an authorization message from the monitoring server;
transmitting a second call request over a second connection to establish the call based on the authorization message;
establishing the call over the second connection with the outside device responsive to transmitting the second call request; and
monitoring, by the client control application, communications during the call.

20. The non-transitory computer-readable medium of claim 19, wherein the first connection is a Wi-Fi connection and the second connection is a cellular connection.

* * * * *